United States Patent
Mizuki et al.

(10) Patent No.: US 12,161,936 B2
(45) Date of Patent: Dec. 10, 2024

(54) INFORMATION PROCESSING APPARATUS HAVING DUAL MODES OF VIDEO GAME OBJECT LAUNCH, AND COUNTERPART METHOD AND SYSTEM

(71) Applicant: NINTENDO CO., LTD., Kyoto (JP)

(72) Inventors: Kiyoshi Mizuki, Kyoto (JP); Shigeru Miyamoto, Kyoto (JP); Tatsuo Nomura, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 18/415,408

(22) Filed: Jan. 17, 2024

(65) Prior Publication Data

US 2024/0149164 A1    May 9, 2024

Related U.S. Application Data

(63) Continuation of application No. 17/590,187, filed on Feb. 1, 2022, now Pat. No. 11,918,905.

(30) Foreign Application Priority Data

Mar. 19, 2021 (JP) ................................ 2021-046296

(51) Int. Cl.
| | |
|---|---|
| *A63F 13/55* | (2014.01) |
| *A63F 13/2145* | (2014.01) |
| *A63F 13/525* | (2014.01) |
| *G06F 3/04883* | (2022.01) |

(52) U.S. Cl.
CPC .......... *A63F 13/55* (2014.09); *A63F 13/2145* (2014.09); *A63F 13/525* (2014.09); *G06F 3/04883* (2013.01); *A63F 2300/1075* (2013.01)

(58) Field of Classification Search
None
See application file for complete search history.

(56) References Cited

U.S. PATENT DOCUMENTS

| | | | |
|---|---|---|---|
| 5,779,548 A | * 7/1998 | Asai | A63F 13/45 463/31 |
| 2006/0082573 A1 | 4/2006 | Konno et al. | |
| 2014/0302900 A1 | * 10/2014 | Lee | A63F 13/5258 463/4 |
| 2022/0297008 A1 | 9/2022 | Mizuki | |

FOREIGN PATENT DOCUMENTS

| | | |
|---|---|---|
| JP | 2004-174077 | 6/2004 |
| JP | 2006-119774 | 5/2006 |

* cited by examiner

*Primary Examiner* — Lawrence S Galka
(74) *Attorney, Agent, or Firm* — Nixon & Vanderhye PC

(57) ABSTRACT

An information processing apparatus includes controlling movement of any of first objects arranged on a field, controlling movement of a second object fed to any of the first objects, and carrying out control such that a first object satisfying prescribed proximity relation with the second object among the first objects acquires the second object. The controlling movement of a second object includes ejecting the second object to the field from a prescribed position in a direction determined based on an accepted first user operation input and moving the second object over the field in accordance with an accepted second user operation input. The controlling movement of any of the first objects moves any of the first objects toward the second object ejected to the field and moves any of the first objects toward the second object that moves over the field.

20 Claims, 22 Drawing Sheets

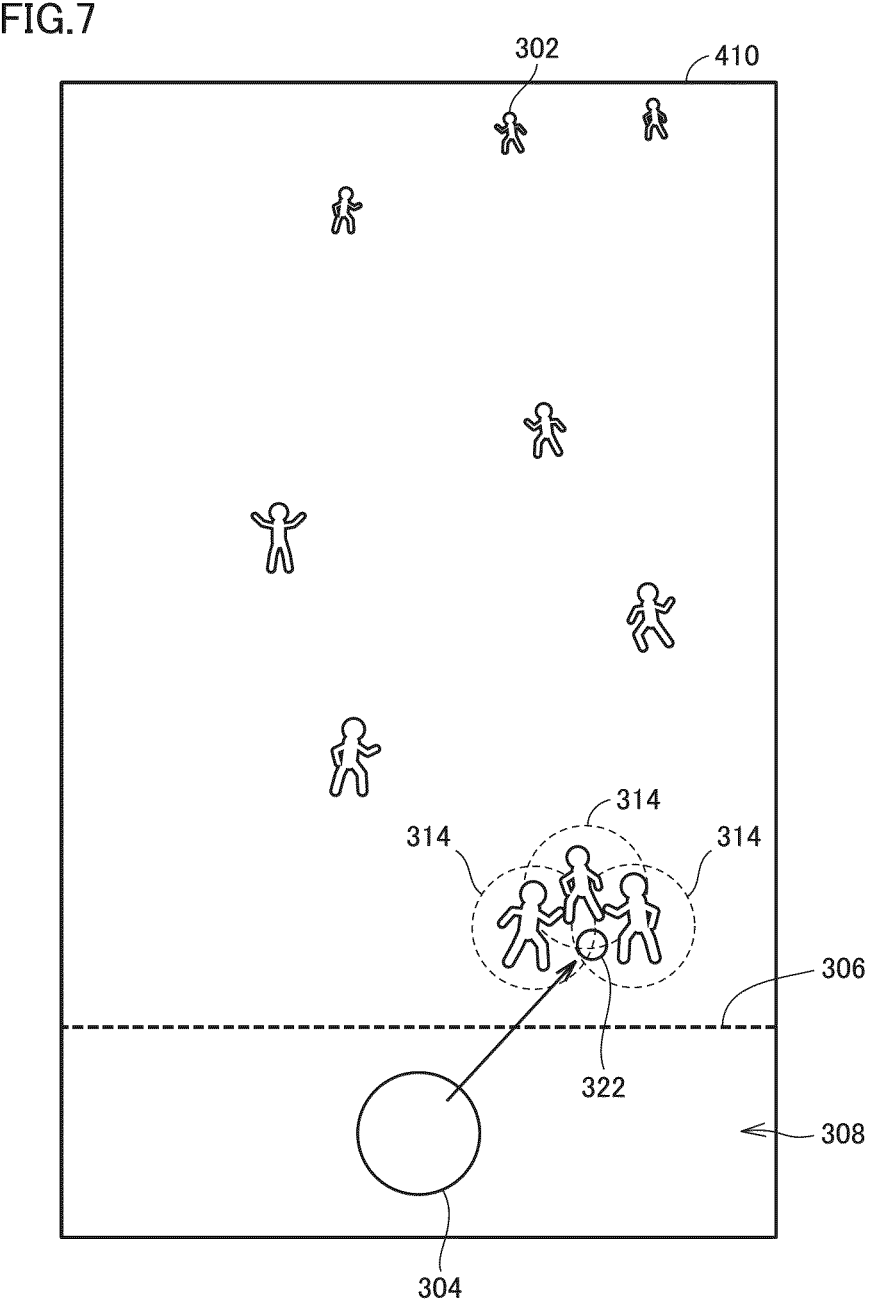

INFORMATION PROCESSING APPARATUS HAVING DUAL MODES OF VIDEO GAME OBJECT LAUNCH, AND COUNTERPART METHOD AND SYSTEM

CROSS-REFERENCE TO RELATED APPLICATIONS

This application is a continuation of Ser. No. 17/590,187 filed Feb. 1, 2022, which claims priority to Japanese Patent Application No. 2021-046296 filed with the Japan Patent Office on Mar. 19, 2021, the entire contents of each of which are hereby incorporated by reference.

FIELD

The present disclosure relates to an information processing apparatus and particularly to an information processing apparatus that performs object movement processing in accordance with an operation input.

BACKGROUND AND SUMMARY

A scheme for operating an object by using an input device has conventionally been proposed. A scheme for determining a coordinate of a position of an object within a three-dimensional space based on a position where a touch panel is pressed has been known.

Though the conventional technique discloses a method of moving an object within the three-dimensional space, there is room for improvement in zest.

The present disclosure was made to solve a problem as above, and an object thereof is to provide an information processing apparatus capable of object movement processing great in zest, a method of controlling an information processing apparatus, and an information processing system.

According to one example of the present disclosure, an information processing apparatus includes controlling movement of any of first objects arranged on a field, controlling movement of a second object fed to any of the first objects, and carrying out control such that a first object satisfying prescribed proximity relation with the second object among the first objects acquires the second object. The controlling movement of a second object includes accepting a first user operation input and ejecting the second object to the field from a prescribed position in a direction determined based on the first user operation input and accepting a second user operation input and moving the second object over the field in accordance with the second user operation input. The controlling movement of any of the first objects moves any of the first objects toward the second object ejected to the field and moves any of the first objects toward the second object that moves over the field. According to this configuration, the second object can be moved in respective different schemes in accordance with the first user operation input and the second user operation input. Therefore, object movement processing great in zest can be performed.

A plurality of second objects are possessed. The number of possessed second objects decreases each time a second object is ejected to the field. In moving the second object over the field, the number of possessed second objects decreases each time the first object satisfying the prescribed proximity relation among the first objects acquires the second object. According to this configuration, how to feed the second object can be different. Therefore, zest can be enhanced.

Among the first objects, the first object moved toward the second object that moves over the field includes a first object more distant from the second object than the first object moved toward the second object ejected to the field. According to this configuration, how to feed the second object can be different. Therefore, zest can be enhanced.

The controlling movement of any of the first objects moves the first object within a first range from the second object ejected to the field and moves the first object within a second range larger than the first range from the second object that moves over the field. According to this configuration, how to feed the second object can be different. Therefore, zest can be enhanced.

The controlling movement of any of the first objects moves the first object satisfying prescribed positional relation with the second object among the first objects, toward the second object ejected to the field, and moves the first objects toward the second object that moves over the field. According to this configuration, the first objects move with respect to the second object. Therefore, object movement processing great in zest can be performed.

The first and second user operation inputs are touch operation inputs onto a touch panel provided on a display screen. The second object is shown as being superimposed on a touch position in response to the first user operation input and shown at a position not superimposed on the touch position in response to the second user operation input. According to this configuration, the position where the second object is shown is different depending on the first and second user operation inputs. Therefore, object movement processing great in zest can be performed.

The controlling movement of a second object determines whether a touch operation onto a touch panel provided on a display screen continues for a prescribed period or longer. When it is determined that the touch operation continues for a period shorter than the prescribed period, the second object is ejected to the field from the prescribed position in the direction determined based on the first user operation input. When it is determined that the touch operation continues for the prescribed period or longer, the second object is moved over the field in accordance with the second user operation input. According to this configuration, switching between a first feeding scheme and a second feeding scheme is made based on the touch operation. Therefore, object movement processing great in zest can be performed.

In a three-dimensional virtual space, a first virtual plane for movement of the prescribed position from which the second object is ejected to the field is different from a second virtual plane for movement of the second object over the field. According to this configuration, switching between the first virtual plane and the second virtual plane that relate to movement of the second object is made. Therefore, object movement processing great in zest can be performed.

The information processing apparatus further includes moving a position of a virtual camera in parallel to the field in accordance with a third user operation input. The virtual camera is provided to satisfy prescribed positional relation with the field. The second object or the first virtual plane is set such that relative positional relation between the position of the virtual camera and the second object is not varied with movement of the position of the virtual camera. According to this configuration, the position of the virtual camera moves in parallel to the field in accordance with the third user operation input to the field. Therefore, object movement processing great in zest can be performed.

The information processing apparatus further includes moving a position of a virtual camera toward or away from the field in accordance with a fourth user operation input. The virtual camera is provided to satisfy prescribed positional relation with the field. The second object or the first virtual plane is set such that relative positional relation between the position of the virtual camera and the second object is not varied with movement of the position of the virtual camera. According to this configuration, the position of the virtual camera moves with respect to the field in accordance with the fourth user operation input to the field. Therefore, object movement processing great in zest can be performed.

The controlling movement of any of the first objects accepts a fifth user operation input for one first object of the first objects and moves the first object in accordance with the fifth user operation input. According to this configuration, the first object can be moved in accordance with the fifth user operation input. Therefore, object movement processing great in zest can be performed.

The controlling movement of any of the first objects accepts a sixth user operation input for selecting one first object of the first objects. The selected first object more readily acquires the second object than a non-selected first object. According to this configuration, movement of the first object selected in accordance with the sixth user operation input is controlled more readily in acquisition of the second object than movement of the non-selected first object. Therefore, object movement processing great in zest can be performed.

The information processing apparatus further includes controlling movement of a third object arranged on the field. The carrying out control carries out control such that the third object satisfying prescribed proximity relation with the second object acquires the second object. When the first object acquires the second object, an event advantageous for a user occurs. When the third object acquires the second object, the event does not occur. According to this configuration, the third object acquires the second object. When the third object acquires the second object, an advantageous event does not occur. Therefore, object movement processing great in zest can be performed.

An information processing method according to another example of the present disclosure includes controlling movement of any of first objects arranged on a field, controlling movement of a second object fed to any of the first objects, and acquiring the second object by a first object satisfying prescribed proximity relation with the second object among the first objects. The controlling movement of a second object includes accepting a first user operation input and ejecting the second object to the field from a prescribed position in a direction determined based on the first user operation input and accepting a second user operation input and moving the second object over the field in accordance with the second user operation input. The controlling movement of any of the first objects includes moving any of the first objects toward the second object ejected to the field and moving any of the first objects toward the second object that moves over the field. According to this configuration, the second object can be moved in respective different schemes in accordance with the first user operation input and the second user operation input. Therefore, object movement processing great in zest can be performed.

An information processing system according to yet another example of the present disclosure includes controlling movement of any of first objects arranged on a field, controlling movement of a second object fed to any of the first objects, and acquiring the second object by a first object satisfying prescribed proximity relation with the second object among the first objects. The controlling movement of a second object includes accepting a first user operation input and ejecting the second object to the field from a prescribed position in a direction determined based on the first user operation input and accepting a second user operation input and moving the second object over the field in accordance with the second user operation input. The controlling movement of any of the first objects moves any of the first objects toward the second object ejected to the field and moves any of the first objects toward the second object that moves over the field. According to this configuration, the second object can be moved in respective different schemes in accordance with the first user operation input and the second user operation input. Therefore, object movement processing great in zest can be performed.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 7 shows an exemplary illustrative non-limiting drawing of control for movement of character object 302 with respect to an item object 322 fed in the second feeding scheme based on the embodiment.

DETAILED DESCRIPTION OF NON-LIMITING EXAMPLE EMBODIMENTS

Figure 1:
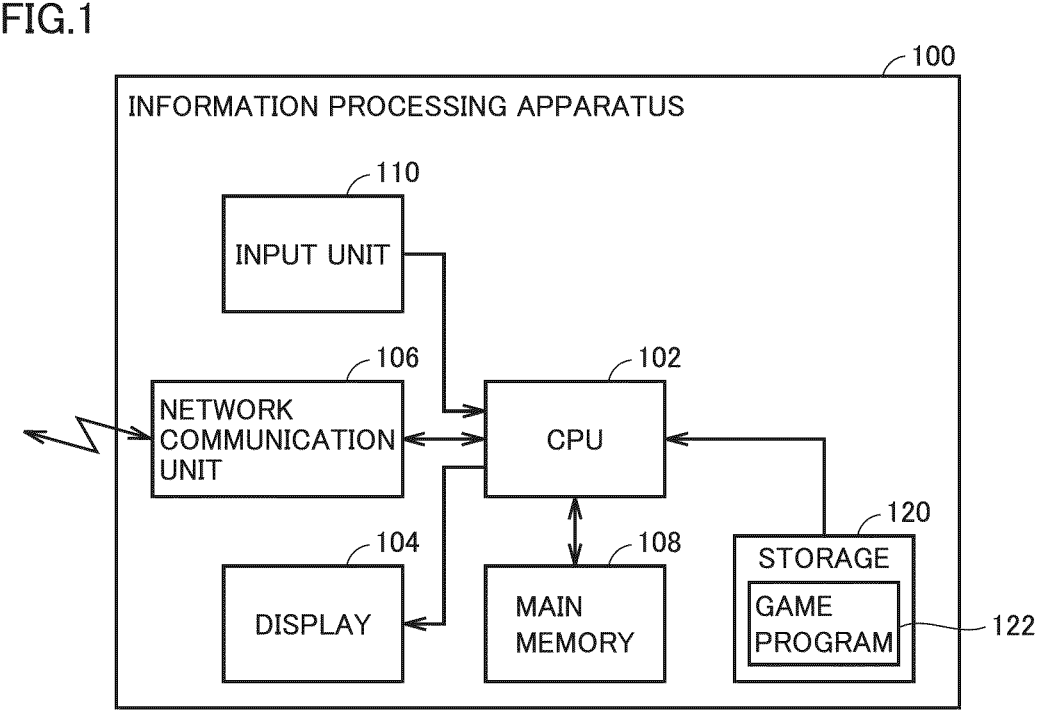
FIG. 1 shows an exemplary illustrative non-limiting drawing of a hardware configuration of an information processing apparatus 100 based on an embodiment.

This embodiment will be described in detail with reference to the drawings. The same or corresponding elements in the drawings have the same reference characters allotted and description thereof will not be repeated.

A. Configuration of Information Processing Apparatus

FIG. 1 is a diagram illustrating a hardware configuration of an information processing apparatus 100 based on an embodiment. By way of example, a configuration where the information processing apparatus according to the embodiment is mounted as a game device will be described.

As shown in FIG. 1, information processing apparatus 100 may be any computer. Information processing apparatus 100 may be, for example, a portable (also referred to as mobile) device such as a portable game device, a portable telephone, or a smartphone, a stationary apparatus such as a personal computer or a home game console, or a large apparatus such as an arcade game machine for a commercial purpose.

The hardware configuration of information processing apparatus 100 is outlined below.

Information processing apparatus 100 includes a CPU 102 and a main memory 108. CPU 102 is an information processor that performs various types of information processing in information processing apparatus 100. CPU 102 performs the various types of information processing by using main memory 108.

Information processing apparatus 100 includes a storage 120. Storage 120 stores various programs (which may include not only a game program 122 but also an operating system) executed in information processing apparatus 100. Any storage (storage medium) accessible by CPU 102 is adopted as storage 120. For example, a storage embedded in information processing apparatus 100 such as a hard disk or a memory, a storage medium attachable to and removable from information processing apparatus 100 such as an optical disc or a cartridge, or combination of a storage and a storage medium as such may be adopted as storage 120. In such a case, a game system representing an exemplary information processing system including information processing apparatus 100 and any storage medium may be configured.

Game program 122 includes computer-readable instructions for performing game processing as will be described later. The game program may also include a program that establishes data communication with a not-shown server and a program that establishes data communication with another information processing apparatus as a part of game processing.

Information processing apparatus 100 includes an input unit 110 that accepts an instruction from a user, such as a button or a touch panel. Information processing apparatus 100 includes a display 104 that shows an image generated through information processing. In the present example, a configuration provided with a touch panel representing input unit 110 on display 104 which is a screen will be described by way of example. Without being limited to the configuration, various input forms and representation forms can be adopted.

Information processing apparatus 100 includes a network communication unit 106. Network communication unit 106 may be connected to a not-shown network and may perform processing for data communication with an external apparatus (for example, a server or another information processing apparatus).

Information processing apparatus 100 may be implemented by a plurality of apparatuses. For example, information processing apparatus 100 may be implemented by a main body apparatus including CPU 102 and an apparatus including input unit 110 and/or display 104, which are separate from each other. For example, in another embodiment, information processing apparatus 100 may be implemented by a main body apparatus and a terminal device including input unit 110 and display 104, or by a main body apparatus and an operation apparatus including input unit 110. Information processing apparatus 100 may employ a television as a display apparatus, without including display 104.

In another embodiment, at least some of information processing performed in information processing apparatus 100 may be performed as being distributed among a plurality of apparatuses that can communicate over a network (a wide range network and/or a local network).

B. Functional Configuration for Implementing Game Processing

Figure 2:
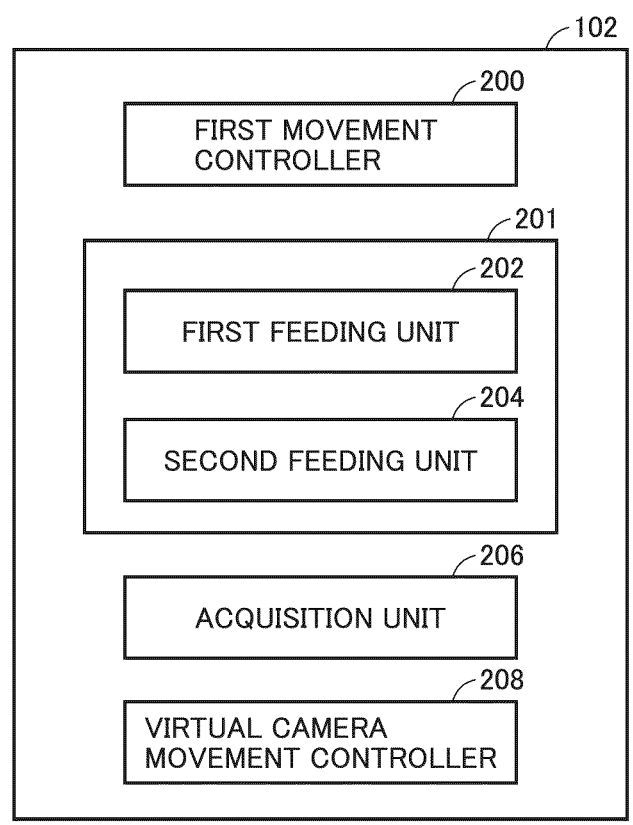
FIG. 2 shows an exemplary illustrative non-limiting drawing of a functional block of information processing apparatus 100 based on the embodiment

FIG. 2 is a diagram illustrating a functional block of information processing apparatus 100 based on the embodiment. Referring to FIG. 2, information processing apparatus 100 includes a first movement controller 200, a second movement controller 201, an acquisition unit 206, and a virtual camera movement controller 208.

First movement controller 200 controls movement of any of character objects (first objects) arranged on a game field. Second movement controller 201 controls movement of an item object (a second object) fed to any of the character objects. Acquisition unit 206 carries out control such that a character object satisfying prescribed proximity relation with an item object among the character objects acquires the item object.

Second movement controller 201 includes a first feeding unit 202 and a second feeding unit 204. First feeding unit 202 accepts a first user operation input and ejects an item object to the game field from a prescribed position in a direction determined based on the first user operation input. Second feeding unit 204 accepts a second user operation input and moves an item object over the game field in accordance with the second user operation input. In the present example, the first and second user operation inputs include a touch operation input to a touch panel provided in display 104. Specifically, the first user operation input includes an operation to cancel touching after moving a touch position (which is referred to as a flick operation in the present example). The second user operation input includes an operation to move the touch position (which is referred to as a touch movement operation in the present example).

First movement controller 200 moves any of character objects toward the item object ejected to the game field by first feeding unit 202. First movement controller 200 moves any of the character objects toward the item object moved over the game field by second feeding unit 204.

Virtual camera movement controller 208 arranges a virtual camera to satisfy prescribed positional relation with the game field. Virtual camera movement controller 208 moves the position of the virtual camera in parallel to the game field, for example, in response to a touch movement operation (a third user operation input) onto the game field.

Virtual camera movement controller 208 moves the position of the virtual camera with respect to the game field while it maintains an attitude in accordance with a pinch operation input (pinch-in or pinch-out) (a fourth user operation input) to the game field. By way of example, the pinch operation input refers to an operation input by a user to touch the touch panel with two fingers and change a distance between the fingers. An operation to decrease spacing as in pinching something between two fingers is also referred to as "pinch-in". An operation to increase spacing by moving two fingers to spread is also referred to as "pinch-out". In the present example, in a pinch-in operation, virtual camera movement controller 208 moves the position of the virtual camera to come closer to the game field while it maintains the attitude. In a pinch-out operation, virtual camera movement controller 208 moves the position of the virtual camera to move away from the game field while it maintains the attitude.

C. Overview of Game Processing

Game processing provided by execution of game program 122 according to the embodiment will now generally be described.

Game program 122 according to the embodiment provides a training game in which a user feeds an item object to character objects. By way of example, as an item object is fed to a character object, an event advantageous for the user during progress of a game may occur. For example, a level of the character object or the user may be increased, or the character object or the user may develop a special skill or acquire various items.

D. Exemplary Representation on Screen in Game Processing

Exemplary representation on a screen and an exemplary operation in game processing provided by execution of game program 122 according to the embodiment will now be described. By way of example, exemplary representation on the screen is provided on display 104 of information processing apparatus 100.

Figure 3:
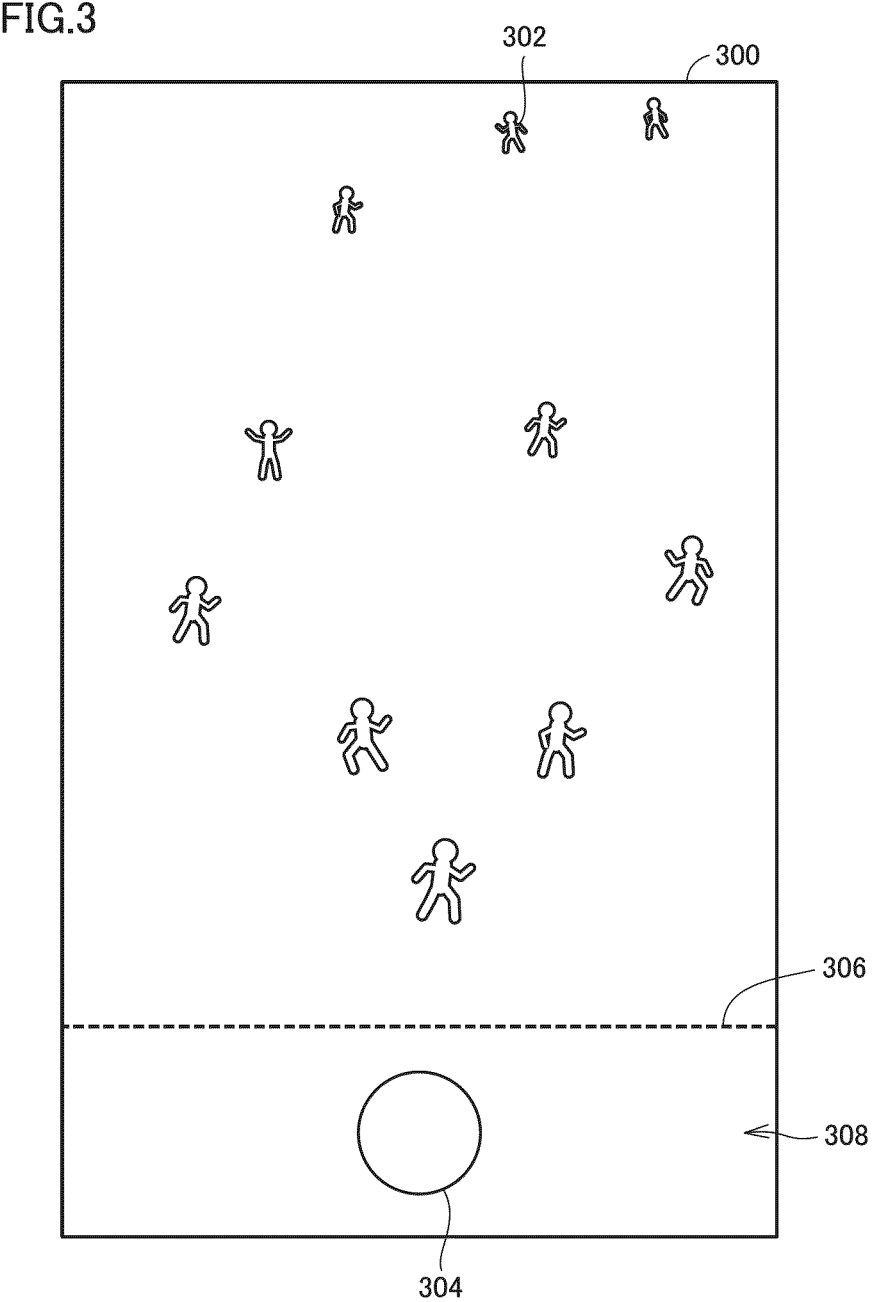
FIG. 3 shows an exemplary illustrative non-limiting drawing of a screen 300 in a game in game processing provided by a game program 122 based on the embodiment.

FIG. 3 is a diagram illustrating a screen 300 in a game in the game processing provided by game program 122 based on the embodiment.

As shown in FIG. 3, character objects 302 are arranged on screen 300. In the present example, the game field is set within a three-dimensional virtual space. For example, by way of example, a horizontal ground is set and character objects 302 are arranged on the ground. By way of example, ten character objects 302 are shown. A virtual camera is arranged at a position where the game field is obliquely looked down, and character objects 302 located in an upper portion on screen 300 are assumed as character objects far from a user and character objects 302 in a lower portion are assumed as character objects close to the user. The game field does not have to be the ground and may be a space having a height. In the present example, though a character object is arranged on the game field which is the ground by way of example, the character object does not necessarily have to be on the ground, and for example, the character object may be flying.

FIG. 3 shows a virtual boundary line 306. Virtual boundary line 306 may be shown on screen 300. An area below virtual boundary line 306 on screen 300 is set as an initial area 308.

In initial area 308, an item object 304 is shown at an initial position which is a central position. Item object 304 can be moved by touching by a user. Specifically, as the user laterally moves item object 304 while the user touches item object 304, item object 304 laterally moves within initial area 308 in accordance with a touch position. When the user cancels touching of item object 304, item object 304 returns to the central position which is the initial position. When the user moves item object 304 in an upward/downward direction while the user touches item object 304, item object 304 moves within or beyond initial area 308. When the user provides a flick operation input to cancel a touch position at a position beyond virtual boundary line 306, the item object is ejected to the game field in accordance with the flick operation input.

When the user touches item object 304 and thereafter moves the touch position beyond virtual boundary line 306 while the user touches the item object, item object 304 moves over the game field in accordance with the touch position. When the user cancels touching, the item object returns to the initial position.

In the present example, item object 304 can be fed to character object 302 in two feeding schemes.

A first feeding scheme refers to such a flick operation input that the user touches item object 304 and thereafter cancels touching at a position beyond virtual boundary line 306. In this case, the item object is ejected to the game field in accordance with the flick operation input. The ejected item object moves over the game field. Character object 302 acquires item object 304 when it satisfies prescribed proximity relation with the item object.

A second feeding scheme refers to such a case that the user touches item object 304 and thereafter further moves the touch position beyond virtual boundary line 306 after lapse of a prescribed period or longer by way of example. In this case, the item object moves over the game field in accordance with the touch position. Character object 302 acquires the item object when it satisfies prescribed proximity relation with the item object.

Therefore, the user can arbitrarily select a scheme for feeding item object 304 and zest of the game can be enhanced.

Though the flick operation input to cancel touching at a position beyond virtual boundary line 306 is described as the first feeding scheme, without being limited to the flick operation input, for example, another operation input to arbitrarily determine a direction may be applicable. For example, item object 304 may be ejected from the initial position in a direction toward a touch position. Though an operation to move the touch position at a position beyond virtual boundary line 306 is described as the second feeding scheme, without being limited as such, for example, another operation input to arbitrarily determine a direction may be applicable.

Figure 4:
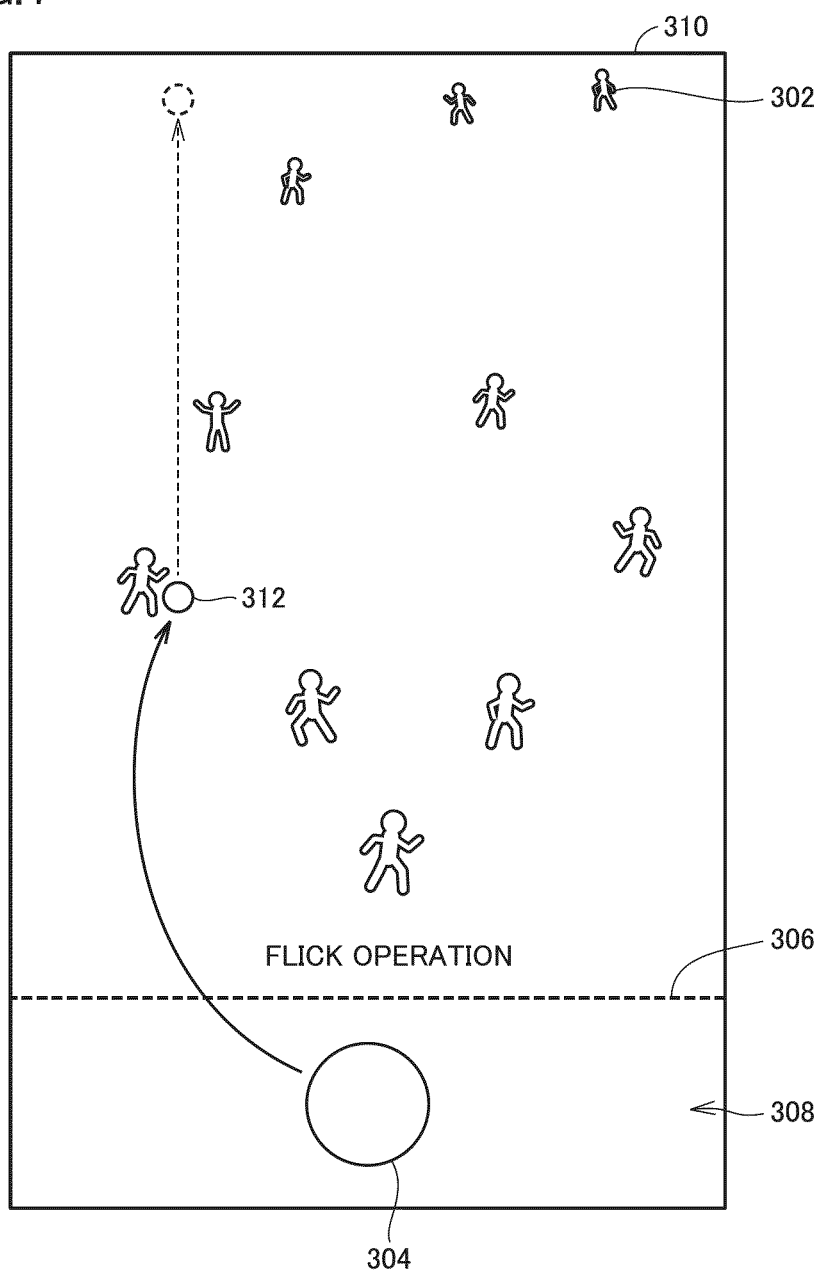
FIG. 4 shows an exemplary illustrative non-limiting drawing of feeding an item object 304 in a first feeding scheme in the game processing provided by game program 122 based on the embodiment.

FIG. 4 is a diagram illustrating feeding item object 304 in the first feeding scheme in the game processing provided by game program 122 based on the embodiment.

FIG. 4 shows an example in which the user provides the flick operation input to touch item object 304 on a screen 310 and thereafter cancel touching at a position beyond virtual boundary line 306. In this case, item object 304 is ejected to the game field in accordance with the flick operation input. In the present example, the user (or an avatar of the user) is assumed to possess a plurality of item objects 304. The user can eject item objects 304 one by one to the game field in accordance with the flick operation input.

In the present example, an item object 312 is ejected as one of item objects 304. Item object 312 is ejected from the prescribed position and moved over the game field through inertia by way of example. In the present example, item object 312 moves in a direction away from the user on the game field.

Item object 312 may be erased when it moves out of an area shown on screen 310 as an area on the game field. Alternatively, when item object 312 is present on the game field for a prescribed period of time without being acquired by character object 302, item object 312 may be erased. Erased item object 312 may again be supplied as item object 304 possessed by the user.

For example, the user is assumed to possess ten item objects 304. When all of ten item objects 304 are ejected, the number of item objects 304 becomes 0. In other words, the number of item objects 304 decreases each time of ejection. When the number of item objects becomes 0, item object 304 cannot be ejected. At this time, no item object 304 may be shown at the initial position.

Figure 5:
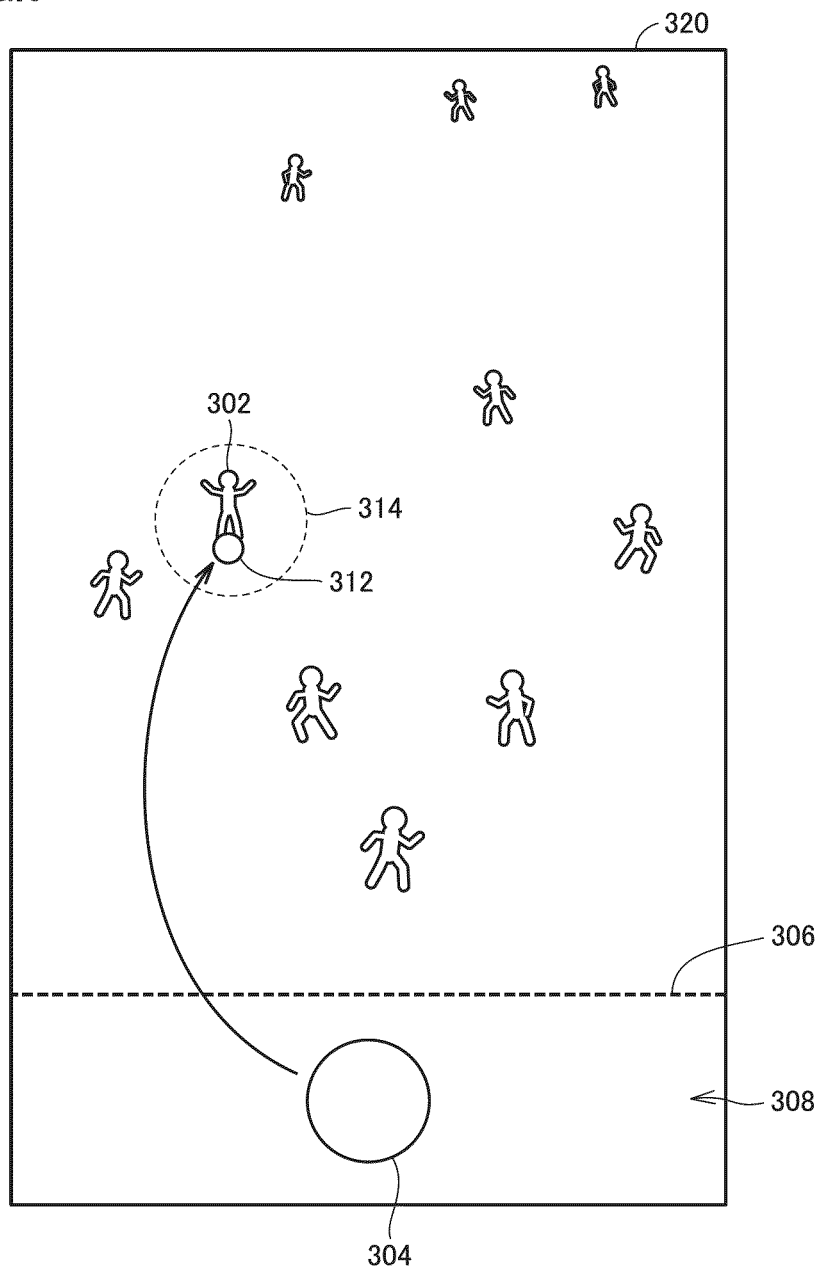
FIG. 5 shows an exemplary illustrative non-limiting drawing of control for movement of a character object 302 with respect to an item object 312 fed in the first feeding scheme based on the embodiment.

FIG. 5 is a diagram illustrating control of movement of character object 302 with respect to item object 312 fed in the first feeding scheme based on the embodiment.

FIG. 5 shows an example in which the user provides the flick operation input to touch item object 304 on a screen 320 and thereafter cancel touching at a position beyond virtual boundary line 306. In this case, item object 312 is ejected to the game field from a prescribed position in accordance with the flick operation input.

First movement controller 200 controls movement of character object 302.

When character object 302 is within a first range with item object 312 being defined as the reference, first movement controller 200 moves character object 302 in a direction toward item object 312.

When character object 302 is moved in the direction toward item object 312 and satisfies prescribed proximity relation (within a range 314 which indicates a prescribed distance or shorter from character object 302 in the present example), it acquires item object 312. When character object 302 acquires item object 312, item object 312 is erased.

When character object 302 is out of the first range after it starts moving toward item object 312 because of a high moving speed of item object 312 over the field, movement of character object 302 toward item object 312 may be stopped.

Though movement of one character object 302 is described in the present example, a plurality of character objects 302 may be moved. Specifically, when there are a plurality of character objects 302 within the first range with item object 312 being defined as the reference, the plurality of character objects 302 may be moved toward item object 312. When one of the plurality of character objects 302 satisfies prescribed proximity relation with item object 312, that character object 302 acquires item object 312 and item object 312 is erased. Therefore, with erasure of item object 312, remaining character object(s) 302 of the plurality of character objects 302 may stop moving toward item object 312.

Character object 302 may start moving toward item object 312, for example, from a time point of ejection of item object 312, from a time point when item object 312 is ejected and rolls over the game field, or from a time point when item object 312 stops moving.

A size of range 314 representing prescribed proximity relation can be changed as appropriate. Though range 314 is shown as an annular range in the present example, it does not have to be annular but may be in a rectangular shape or another shape.

Figure 6:
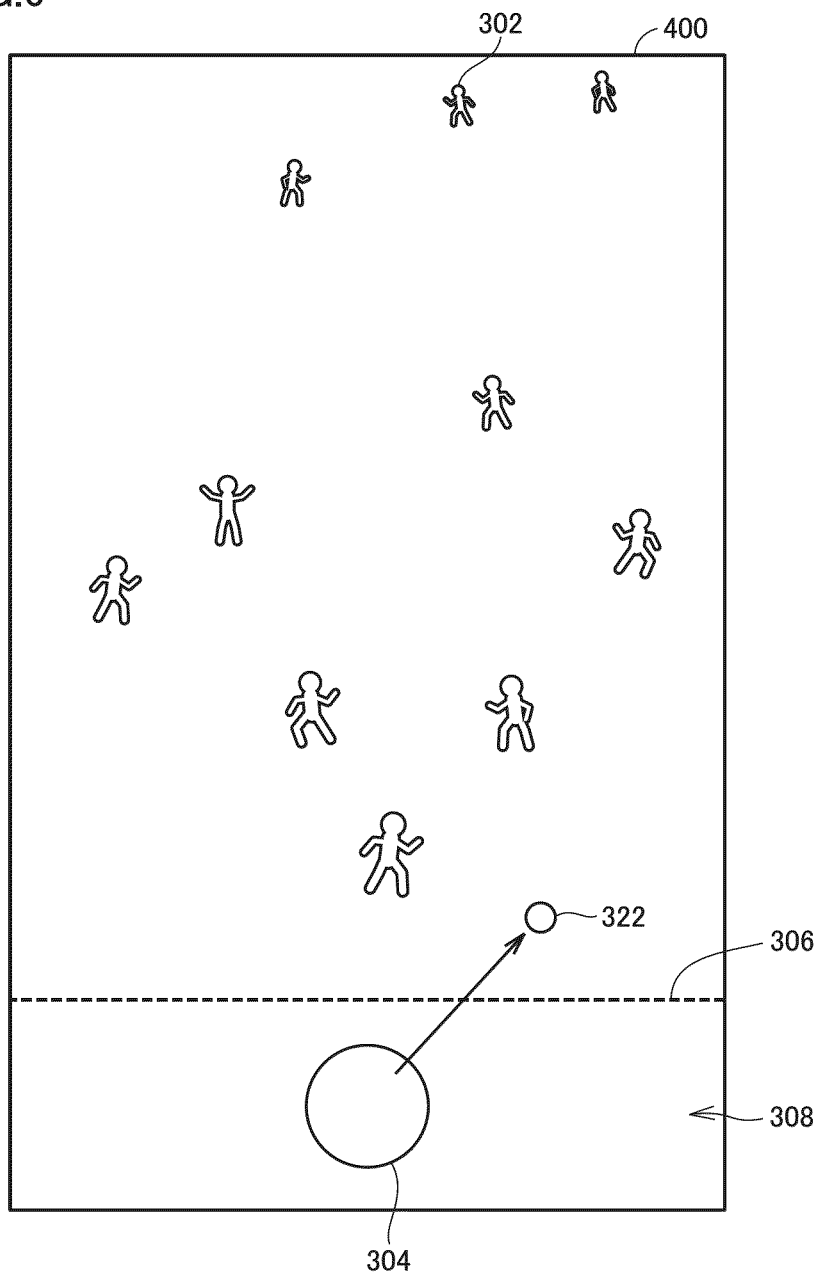
FIG. 6 shows an exemplary illustrative non-limiting drawing of feeding item object 304 in a second feeding scheme in the game processing provided by game program 122 based on the embodiment.

FIG. 6 is a diagram illustrating feeding item object 304 in the second feeding scheme in the game processing provided by game program 122 based on the embodiment.

As shown in FIG. 6, on a screen 400, after the user touches item object 304, the user moves the touch position beyond virtual boundary line 306 while the user keeps touching. In this case, an item object 322 moves over the game field in accordance with the touch position. When the user cancels touching, item object 322 is erased and item object 304 is shown at the initial position.

FIG. 7 is a diagram illustrating control for movement of character object 302 with respect to item object 322 fed in the second feeding scheme based on the embodiment.

As shown in FIG. 7, on a screen 410, after the user touches item object 304, the user moves the touch position beyond virtual boundary line 306 while the user keeps touching. In this case, item object 322 moves over the game field in accordance with the touch position.

When character object 302 is within a second range with item object 322 being defined as the reference, first movement controller 200 moves character object 302 toward item object 322.

By way of example, three character objects 302 move toward item object 322. A range larger than the first range can be set as the second range. Character object 302 far from item object 322 can also move toward item object 322. Though an example in which character object 302 within the second range moves is described in the present example, in the second feeding scheme, all character objects 302 may move toward item object 322.

In the present example, for example, when the user possesses ten item objects 304, three character objects 302 that satisfy prescribed proximity relation with item object 322 can all acquire item object 322. In other words, item object 322 can also be said as a set of item objects 304. When item object 322 satisfies prescribed proximity relation with character object 302 and is acquired, the number of ten possessed item objects 304 is decreased one by one. When the number of possessed item objects 304 becomes 0, item object 322 is erased. In another example, each one of possessed item objects 304 may be moved over the field as item object 322. In other words, in this case, when any character object 302 acquires item object 322, item object 322 is erased.

As described above, in feeding item object 304 to a plurality of character objects 302, the user can perform an operation to eject item object 312 in any direction in the first feeding scheme and zest of the game can be enhanced. Character object 302 moves toward ejected item object 312. Therefore, for example, even when there is no character object 302 in a direction in which item object 312 is ejected, character object 302 is more likely to acquire item object 312. Therefore, decline in motivation of the user for an operation to eject item object 312 can be suppressed.

When the user intends to feed item object 304 to a specific character object 302, the user may not be able to feed item object 304 to specific character object 302 due to deviation of the set direction of ejection of item object 312 or acquisition of ejected item object 312 by unintended character object 302.

In the second feeding scheme, item object 322 can be moved to any position on the game field in accordance with an operation by the user. Therefore, item object 322 can be moved to the vicinity of a specific character object. A situation intended by the user can thus be created and zest of the game can be enhanced. On the other hand, with movement of item object 322, other character objects 302 also move, and hence the user has to control a path for movement of item object 322 so as to avoid acquisition of item object 322 by unintended character object 302, which can give zest to an operation to move item object 322. Zest of the game can thus be given by providing different operability or zest to both of the first and second feeding schemes.

E. Description of Scheme for Feeding Item Object

Figure 8A:
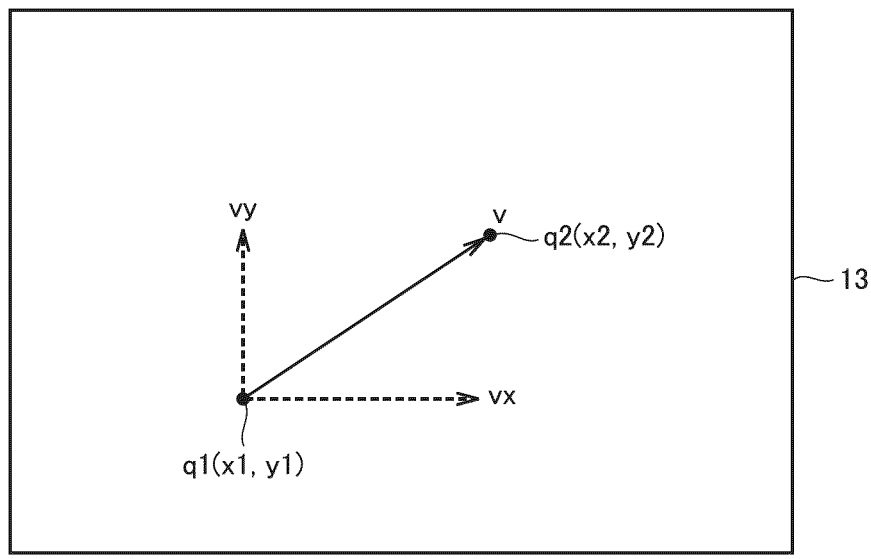
FIGS. 8A and 8B show exemplary illustrative non-limiting drawings of a touch operation onto a touch panel according to the embodiment.
Figure 8B:
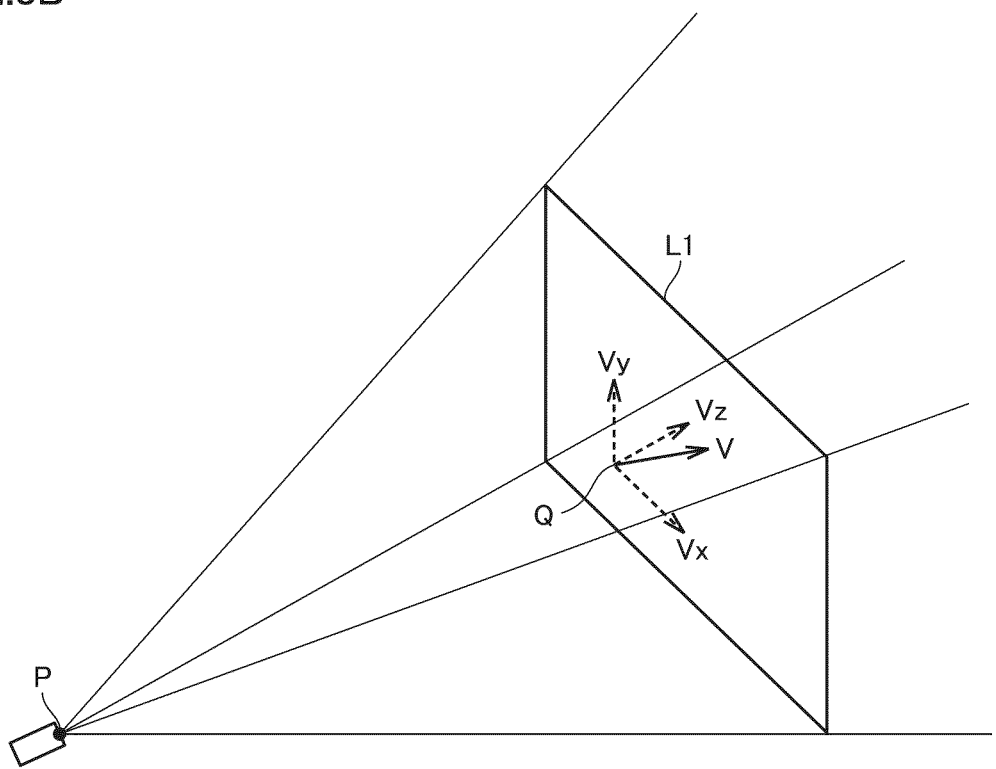

FIGS. 8A and 8B are diagrams illustrating an operation onto the touch panel according to the embodiment.

A method of setting a direction of ejection and a speed of ejection of item object 304 will be described with reference to FIG. 8A. A position of ejection of item object 304 is set at a prescribed position Q on a first virtual plane L1 shown with a three-dimensional coordinate within a three-dimensional space which will be described later.

In the present example, on touch panel 13, touching is canceled at a point q2 (x2, y2) on a touch panel coordinate system by way of example. At this time, a point q1 (x1, y1) which is a touch position a prescribed time period before the time point of cancelation of touching is referred to. Then, a vector v (vx, vy) that connects point q1 and point q2 to each other is calculated based on point q1 (x1, y1) and point q2 (x2, y2). vx and vy are calculated as vx=x2−x1 and vy=y2−y1.

Then, a three-dimensional vector V (Vx, Vy, Vz) within the three-dimensional space is calculated by coordinate conversion of two-dimensional vector v (vx, vy). Coordinate conversion from two-dimensional vector v (vx, vy) to three-dimensional vector V (Vx, Vy, Vz) is carried out based on a prescribed function. Vz may be set to a constant.

Referring to FIG. 8B, first virtual plane L1 is set at a prescribed position with respect to a position P of the virtual camera. In the present example, item object 312 is ejected in the direction of ejection shown with three-dimensional vector V from prescribed position Q on first virtual plane L1.

Specifically, when the user touches item object 304 and moves the touch position beyond virtual boundary line 306 while the user keeps touching, item object 304 moves over first virtual plane L1 with that movement. Movement over first virtual plane L1 encompasses not only movement of item object 304 as digging its way in first virtual plane L1 but also movement as being in contact with the first virtual plane or movement while the item object maintains prescribed positional relation. Then, when touching by the user is canceled, item object 304 is ejected with a position of item object 304 at that time being defined as prescribed position Q. In the present example, prescribed position Q moves over first virtual plane L1. Prescribed position Q is not limited to a position on first virtual plane L1 at the time point of cancelation of touching but may be a position in the vicinity thereof, a position at a time point before that time point, or a position calculated separately based on point q2 (x2, y2). Prescribed position Q may be fixed. By way of example, with a specific position on first virtual plane L1 corresponding to the position of item object 304 which is the initial position being defined as prescribed position Q, item object 312 may be ejected from that position. In the present example, the speed of ejection is set in accordance with magnitude of three-dimensional vector V by way of example. Therefore, for example, when point q1 (x1, y1) is distant from point q2 (x2, y2), the speed of ejection of item object 312 is high and the item object reaches a point far from the position of ejection.

Figure 9:
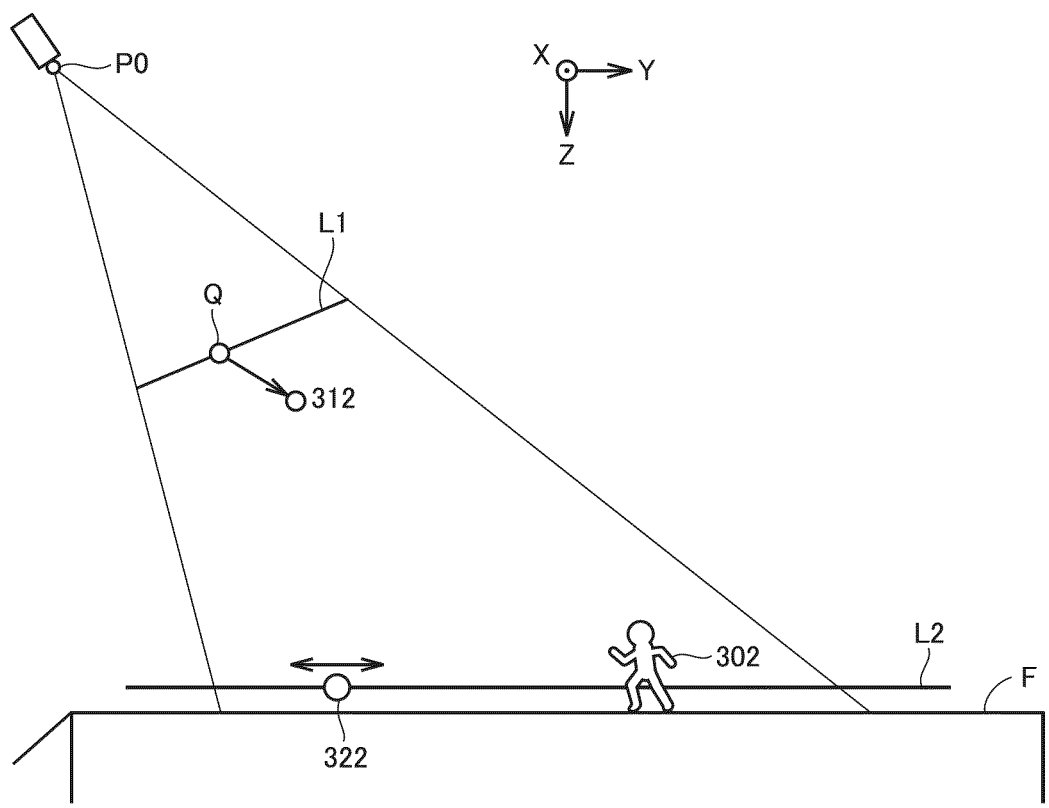
FIG. 9 shows an exemplary illustrative non-limiting drawing of relation of a game field with a first virtual plane and a second virtual plane set in a three-dimensional virtual space according to the embodiment.

FIG. 9 is a diagram illustrating relation of the game field with the first virtual plane and the second virtual plane set within the three-dimensional virtual space according to the embodiment.

Referring to FIG. 9, a game field F is set within the three-dimensional virtual space. The virtual camera (a position P0) is arranged at a position satisfying prescribed positional relation with game field F. The virtual camera (position P0) is provided obliquely above game field F. A range of game field F imaged by the virtual camera (position P0) is shown on display 104.

First virtual plane L1 is set at a position satisfying prescribed positional relation with the virtual camera (position P0) within the three-dimensional virtual space. A second virtual plane L2 is provided in parallel to game field F by way of example.

As described above, first virtual plane L1 is a plane used in ejection of item object 312. Specifically, item object 312 is ejected from prescribed position Q on first virtual plane L1. The direction of ejection and the speed of ejection of item object 312 are calculated based on two-dimensional vector v in accordance with a flick operation onto touch panel 13 as described with reference to FIGS. 8A and 8B.

When the user gives a flick operation input to touch item object 304 and thereafter cancel touching at a position beyond virtual boundary line 306, first feeding unit 202 calculates prescribed position Q on first virtual plane L1, the direction of ejection, and the speed of ejection in accordance with a touch coordinate on touch panel 13 at the time of the flick operation. First feeding unit 202 ejects item object 312 to the game field and controls movement of item object 312.

Second virtual plane L2 is a plane used in movement of item object 322 by the second feeding unit. Specifically, item object 322 moves over second virtual plane L2. Second feeding unit 204 moves item object 322 to a position on second virtual plane L2 set in accordance with a touch coordinate on touch panel 13. Movement over second virtual plane L2 encompasses not only movement of item object 322 as crossing second virtual plane L2 but also movement as being in contact with the second virtual plane or movement while the item object maintains prescribed positional relation. Item object 312 ejected from the first virtual plane may be controlled to move over second virtual plane L2. In other words, as item object 312 moves over second virtual plane L2, item object 312 may be shown as moving over game field F.

When the user touches item object 304 and thereafter moves the touch position beyond virtual boundary line 306, second feeding unit 204 converts a touch coordinate on touch panel 13 and calculates a position on second virtual plane L2. By way of example, when a duration of touching after the touch position is moved beyond virtual boundary line 306 exceeds a prescribed period, second feeding unit 204 arranges item object 322 at a calculated position on second virtual plane L2 and carries out movement control for moving the item object over second virtual plane L2 in accordance with a touch position.

Therefore, switching between the virtual planes over which the item object is moved is made in accordance with an operation input from the user. Specifically, in the first feeding scheme, first virtual plane L1 is used. In the second feeding scheme, second virtual plane L2 is used.

F. Description of Movement of Virtual Camera

Figure 10:
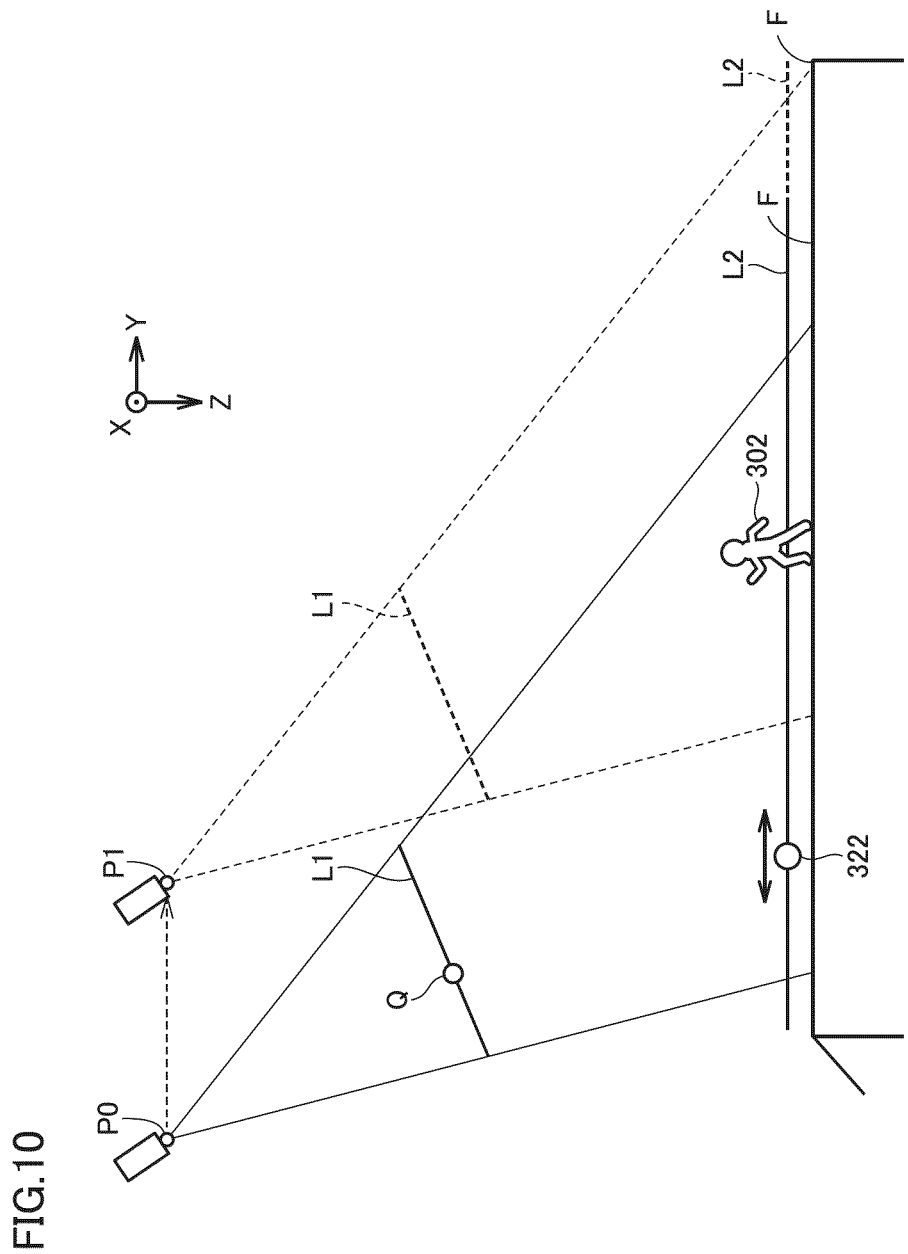
FIG. 10 shows an exemplary illustrative non-limiting drawing of movement (No. 1) of a virtual camera in the game processing provided by game program 122 based on the embodiment.

FIG. 10 is a diagram illustrating movement (No. 1) of the virtual camera in the game processing provided by game program 122 based on the embodiment.

As shown in FIG. 10, virtual camera movement controller 208 moves the virtual camera (position P0) in parallel to game field F in accordance with a movement operation input (third user operation input) for movement with respect to game field F. When touching is canceled after the movement operation input, movement of the virtual camera is stopped. In the present example, the virtual camera is moved to a position P1.

In the present example, first virtual plane L1 is also moved such that relative positional relation is not varied with movement of position P of the virtual camera under the control by virtual camera movement controller 208. In other words, when item object 304 is located and shown on first virtual plane L1, a position where item object 304 is shown is not varied in spite of movement of position P of the virtual camera. Therefore, a wide range can be set as the game field without impairing operability of the user and zest of the game can be enhanced.

Figure 11:
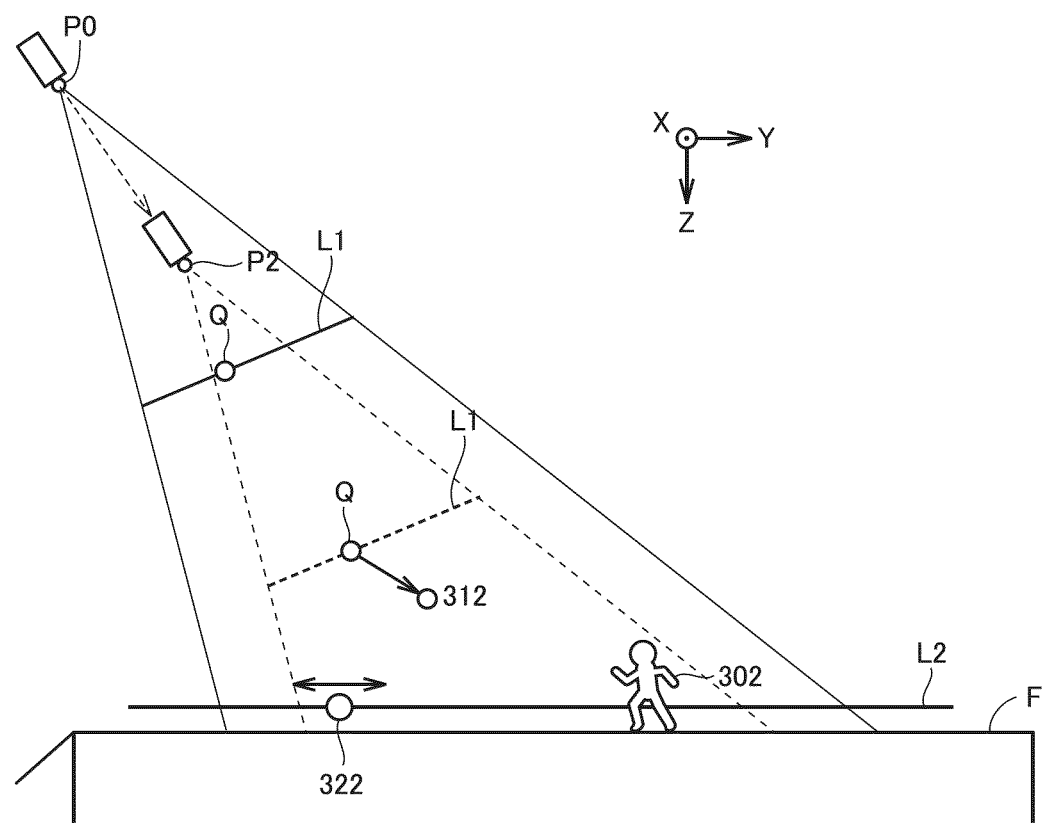
FIG. 11 shows an exemplary illustrative non-limiting drawing of movement (No. 2) of the virtual camera in the game processing provided by game program 122 based on the embodiment.

FIG. 11 is a diagram illustrating movement (No. 2) of the virtual camera in the game processing provided by game program 122 based on the embodiment.

As shown in FIG. 11, virtual camera movement controller 208 moves position P0 of the virtual camera toward or away from game field F while it maintains the attitude in accordance with a pinch operation input (pinch-in or pinch-out) (a fourth user operation input) to the game field. In the present example, position P0 of the virtual camera is moved to a position P2 in accordance with the pinch operation input (pinch-in).

In the present example, first virtual plane L1 is also moved such that relative positional relation is not varied with movement of position P of the virtual camera under the control by virtual camera movement controller 208. Therefore, the game field can be shown as being zoomed in or out without impairing operability of the user and zest of the game can be enhanced.

G. Control of Representation of Item Object

Figure 12A:
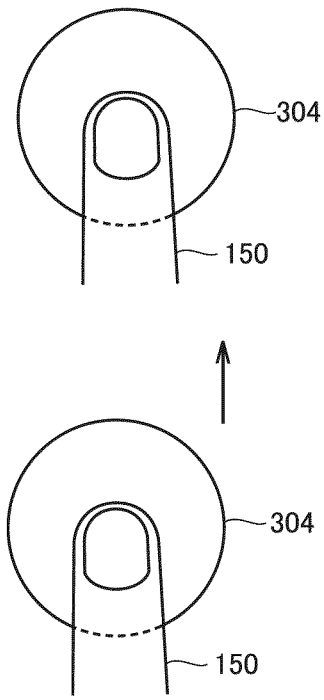
FIGS. 12A and 12B show exemplary illustrative non-limiting drawings of control for representation of an item object based on the embodiment.
Figure 12B:
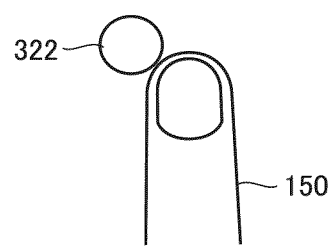

FIGS. 12A and 12B are diagrams illustrating control of representation of an item object based on the embodiment.

As shown in FIGS. 12A and 12B, representation of the item object may be varied between the first feeding scheme and the second feeding scheme.

FIG. 12A is a diagram illustrating representation of item object 312 in accordance with the first feeding scheme. By way of example, a finger 150 of the user who operates item object 304 is shown. In the first feeding scheme, item object 304 to be ejected is shown at a touch position which is a position touched by the user.

When the user touches item object 304 and thereafter moves finger 150 while the user keeps touching, item object 312 is shown as following the touch position. By canceling touching from this state, item object 312 is shown as moving away from the touch position by ejection.

Immediately after the user touches item object 304, the user may be notified of acceptance of a touch input, for example, by emphasized representation such as increase in size of item object 304 or flashing of item object 304.

FIG. 12B is a diagram illustrating representation of item object 322 in accordance with the second feeding scheme. By way of example, finger 150 of the user who operates item object 304 is shown. In the second feeding scheme, item object 322 is shown at a position different from the touch position which is the position touched by the user.

Specifically, in the second feeding scheme, item object 304 is shown at a position not superimposed on the touch position which is the position touched by the user with finger 150. In the second feeding scheme, item object 322 moves over second virtual plane L2 and it is distant from the virtual camera. Therefore, item object 322 is shown with a small size. Then, by not allowing the position where item object 304 is shown to be superimposed on the touch position, for example, such a situation as difficulty in view of item object 322 by being hidden by finger 150 can be avoided. With such representation, the user can also readily identify the second feeding scheme.

By way of example, item object 322 is moved to a position on second virtual plane L2, where the item object is shown at upper left of a touch coordinate where an operation to touch with finger 150 is performed. Without being limited as such, the item object may be shown at another position.

H. Processing Procedure in Game Processing

A processing procedure in the game processing provided by execution of game program 122 according to the embodiment will now be described. Each step is performed by execution of game program 122 by CPU 102.

Figure 13:
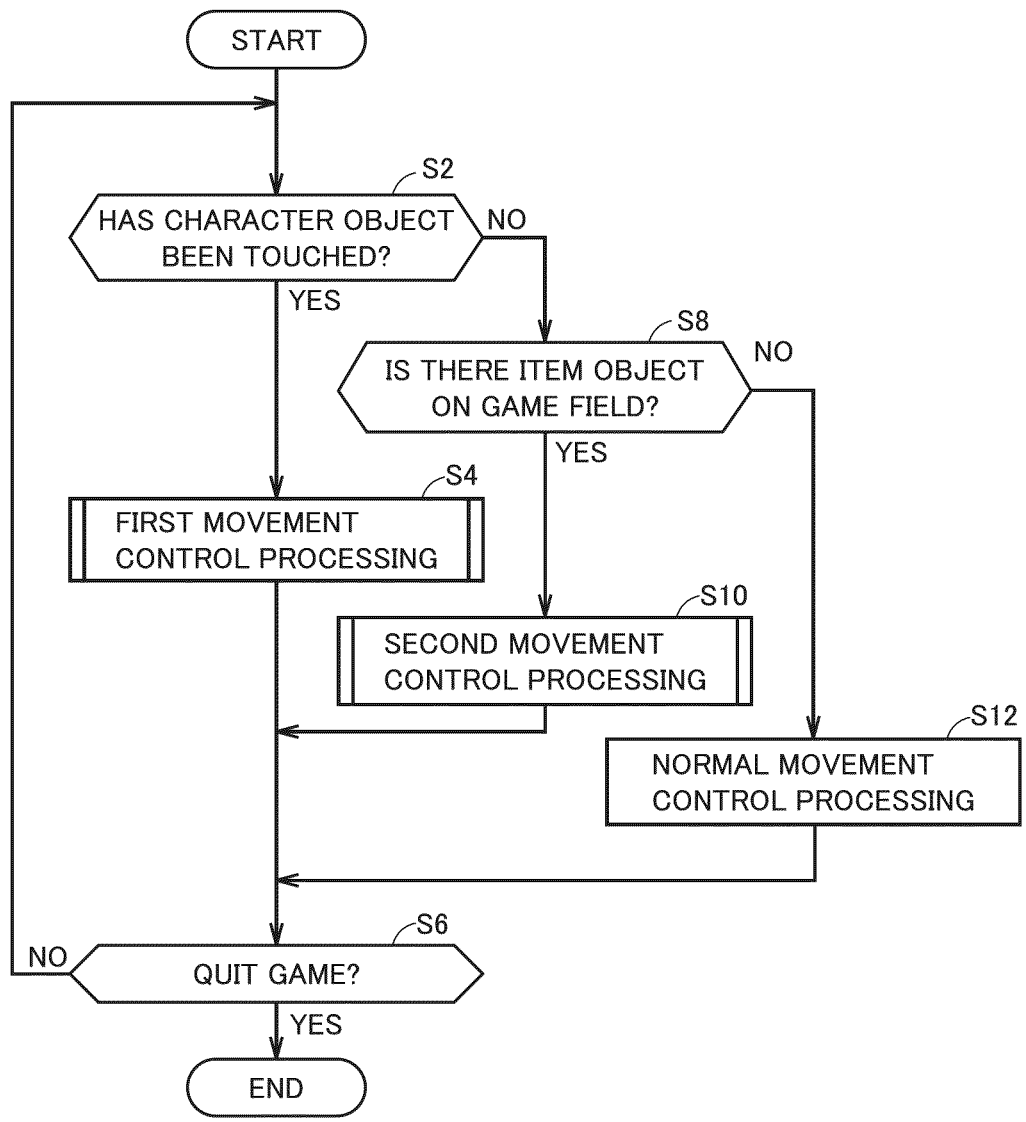
FIG. 13 shows an exemplary illustrative non-limiting flowchart of processing by a first movement controller 200 provided by game program 122 based on the embodiment.

FIG. 13 is a flowchart illustrating processing by first movement controller 200 provided by game program 122 based on the embodiment.

Referring to FIG. 13, first movement controller 200 determines whether or not character object 302 has been touched (step S2).

When first movement controller 200 determines in step S2 that the character object has been touched (YES in step S2), it performs first movement control processing (step S4). Details of first movement control processing will be described later.

Then, first movement controller 200 determines whether or not to quit the game (step S6).

When first movement controller 200 determines in step S6 to quit the game (YES in step S6), the process ends (end).

When first movement controller 200 determines in step S6 not to quit the game (NO in step S6), the process returns to step S2 and the processing above is repeated.

When first movement controller 200 determines in step S2 that the character object has not been touched (NO in step S2), it determines whether or not there is an item object on the game field (step S8).

When first movement controller 200 determines in step S8 that there is an item object on the game field (YES in step S8), it performs second movement control processing (step S10). Details of second movement control processing will be described later.

Then, the process proceeds to step S6. When first movement controller 200 determines not to quit the game (NO in step S6), the process returns to step S2 and the processing above is repeated.

When first movement controller 200 determines in step S8 that there is no item object on the game field (NO in step S8), it performs normal movement control processing (step S12). First movement controller 200 may move character object 302 in a random direction as normal movement control processing.

Then, the process proceeds to step S6. When first movement controller 200 determines not to quit the game (NO in step S6), the process returns to step S2 and the processing above is repeated.

Figure 14:
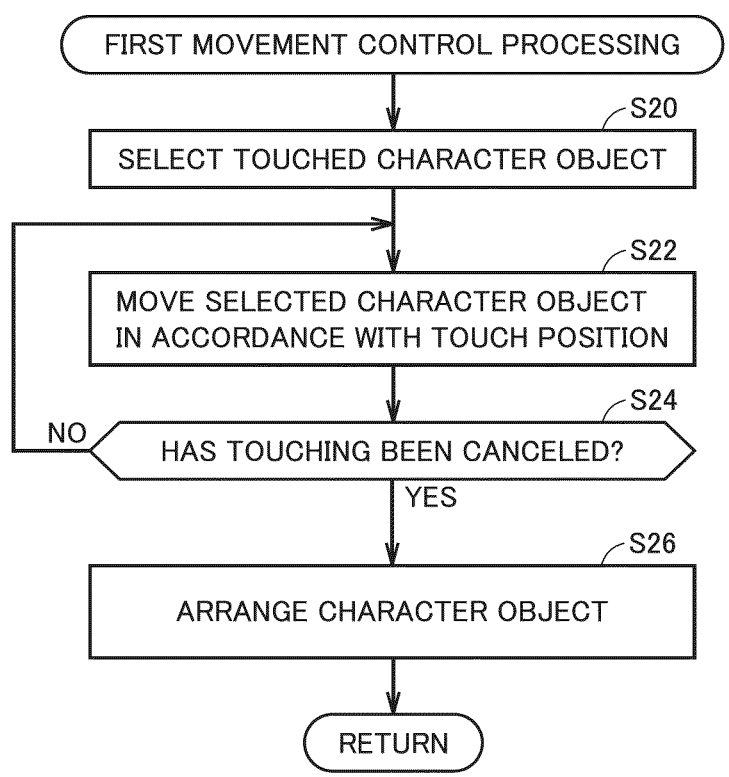
FIG. 14 shows an exemplary illustrative non-limiting flowchart of first movement control processing by first movement controller 200 based on the embodiment.

FIG. 14 is a flowchart illustrating first movement control processing by first movement controller 200 based on the embodiment. Referring to FIG. 14, first movement controller 200 selects a touched character object (step S20). Then, first movement controller 200 moves selected character object 302 in accordance with movement of the touch position (step S22).

Then, first movement controller 200 determines whether or not touching has been canceled (step S24). When first movement controller 200 determines that touching has been canceled (YES in step S24), it arranges selected character object 302 at a position on the game field corresponding to the touch position where touching has been canceled.

Then, the process ends (return).

When first movement controller 200 determines that touching has not been canceled (NO in step S24), the process returns to step S22 and the processing above is repeated.

In other words, first movement controller 200 can move character object 302 in accordance with a flick operation input for character object 302. In other words, the user can select any of character objects 302 and move the selected character object to any position, and zest of the game is improved.

Specific character object 302 can thus be selected and moved to a position in the vicinity of item object 312 or moved away therefrom.

Selected character object 302 may be not permitted to move to the initial position where item object 304 is provided. Thus, item object 304 cannot directly be fed to selected character object 302. In other words, since item object 304 should be fed in any of the first and second feeding schemes, measures for feeding item object 304 to intended character object 302 are required and zest of the game can be maintained.

Figure 15:
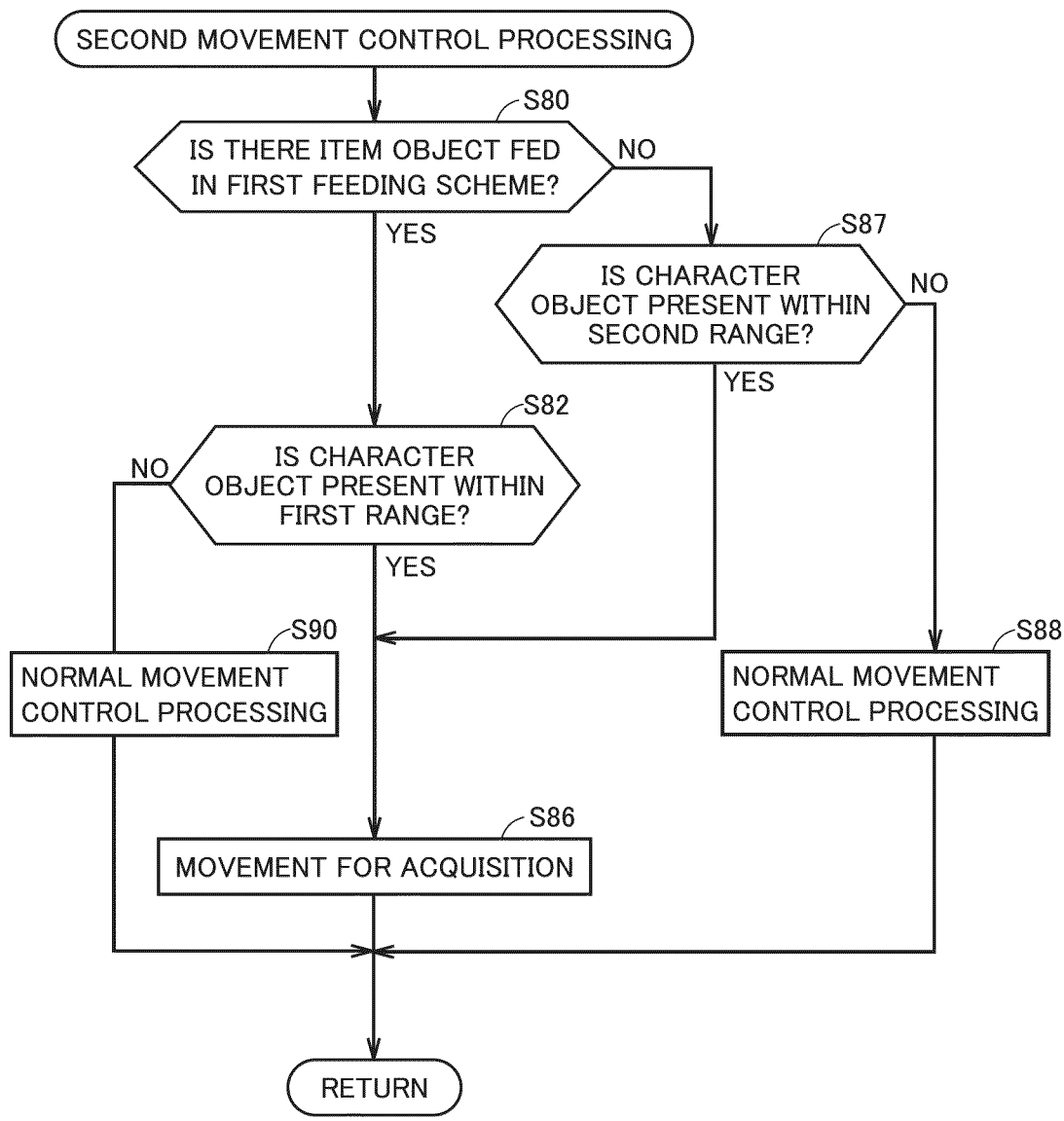
FIG. 15 shows an exemplary illustrative non-limiting flowchart of second movement control processing by first movement controller 200 based on the embodiment.

FIG. 15 is a flowchart illustrating second movement control processing by first movement controller 200 based on the embodiment.

Referring to FIG. 15, first movement controller 200 determines whether or not there is item object 312 fed in the first feeding scheme on the game field (step S80).

When first movement controller 200 determines that there is item object 312 fed in the first feeding scheme on the game field (YES in step S80), it determines whether or not character object 302 is present within the first range set with item object 312 being defined as the reference (step S82).

When first movement controller 200 determines in step S82 that character object 302 is present within the first range (YES in step S82), it performs movement processing for acquisition for that character object 302 (step S86). First movement controller 200 controls character object 302 to move toward item object 312. At this time, character object 302 may move toward item object 312 at a speed higher than the moving speed in normal movement control processing.

Then, first movement controller 200 quits the process (return).

When first movement controller 200 determines in step S82 that character object 302 is not present within the first range (NO in step S82), it performs normal movement control processing (step S90). First movement controller 200 may move character object 302 in a random direction as normal movement control processing.

When first movement controller 200 determines that there is no item object 312 fed in the first feeding scheme on the game field (NO in step S80), it means that there is item object 322 fed in the second feeding scheme on the game field (that is, on second virtual plane L2), and first movement controller 200 determines whether or not character object 302 is within the second range set with item object 312 being defined as the reference (step S87).

When first movement controller 200 determines in step S87 that character object 302 is present within the second range, it performs movement processing for acquisition for that character object 302 (step S86). First movement controller 200 controls character object 302 to move toward item object 322. A manner or a speed in movement for acquisition by character object 302 may be the same as or different from that in movement toward item object 312 in the first feeding scheme.

Then, first movement controller 200 quits the process (return).

When first movement controller 200 determines in step S87 that character object 302 is not present within the second range (NO in step S87), it performs normal movement control processing (step S88). Processing thereafter is similar to the above.

Then, first movement controller 200 quits the process (return).

Figure 16:
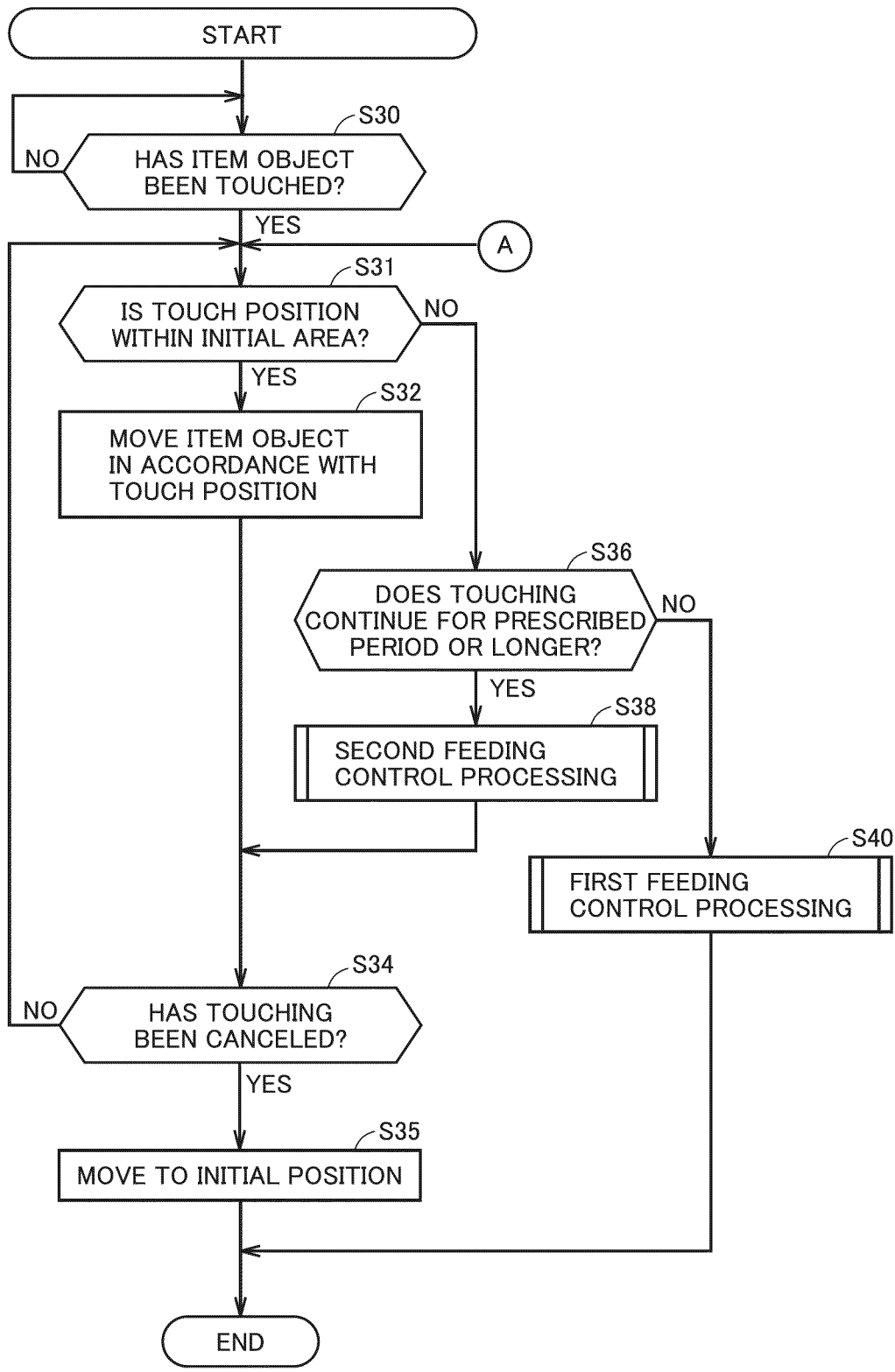
FIG. 16 shows an exemplary illustrative non-limiting flowchart of processing by a second movement controller 201 provided by game program 122 based on the embodiment.

FIG. 16 is a flowchart illustrating processing by second movement controller 201 provided by game program 122 based on the embodiment.

Referring to FIG. 16, second movement controller 201 determines whether or not an item object has been touched (step S30).

When second movement controller 201 determines in step S30 that item object 304 has been touched (YES in step S30), the process proceeds to next step S31.

When second movement controller 201 determines in step S30 that item object 304 has not been touched (NO in step S30), the state in step S30 is maintained.

Then, in step S31, second movement controller 201 determines whether or not the touch position where item object 304 has been touched is within the initial area.

When second movement controller 201 determines in step S31 that the touch position where item object 304 has been touched is within the initial area (YES in step S31), it moves item object 304 in accordance with the touch position (step S32). When second movement controller 201 determines that the touch position where item object 304 has been touched is within initial area 308 as described with reference to FIG. 3, it laterally moves item object 304 in accordance with the touch position within initial area 308.

Then, second movement controller 201 determines whether or not touching onto item object 304 has been canceled (step S34).

When second movement controller 201 determines in step S34 that touching onto item object 304 has been canceled (YES in step S34), it moves item object 304 to the initial position (step S35). Then, the process ends (end). When second movement controller 201 determines that touching onto item object 304 has been canceled as described with reference to FIG. 3, it moves item object 304 to the initial position.

When second movement controller 201 determines in step S34 that touching has not been canceled (NO in step S34), the process returns to step S31 and the processing above is repeated.

When second movement controller 201 determines in step S31 that the touch position where item object 304 has been touched is not within the initial area, that is, the touch position has moved beyond virtual boundary line 306 (NO in step S31), it determines whether or not touching onto item object 304 continues for a prescribed period or longer on the outside of the initial area (step S36).

When second movement controller 201 determines in step S36 that touching onto item object 304 continues for the prescribed period or longer on the outside of the initial area (YES in step S36), it performs second feeding control processing (step S38). Details of second feeding control processing will be described later. Then, the process proceeds to step S34.

When second movement controller 201 determines in step S36 that touching onto the item object does not continue for the prescribed period or longer on the outside of the initial area (NO in step S36), it performs first feeding control processing (step S40). Details of first feeding control processing will be described later. Then, the process ends (end).

Figure 17:
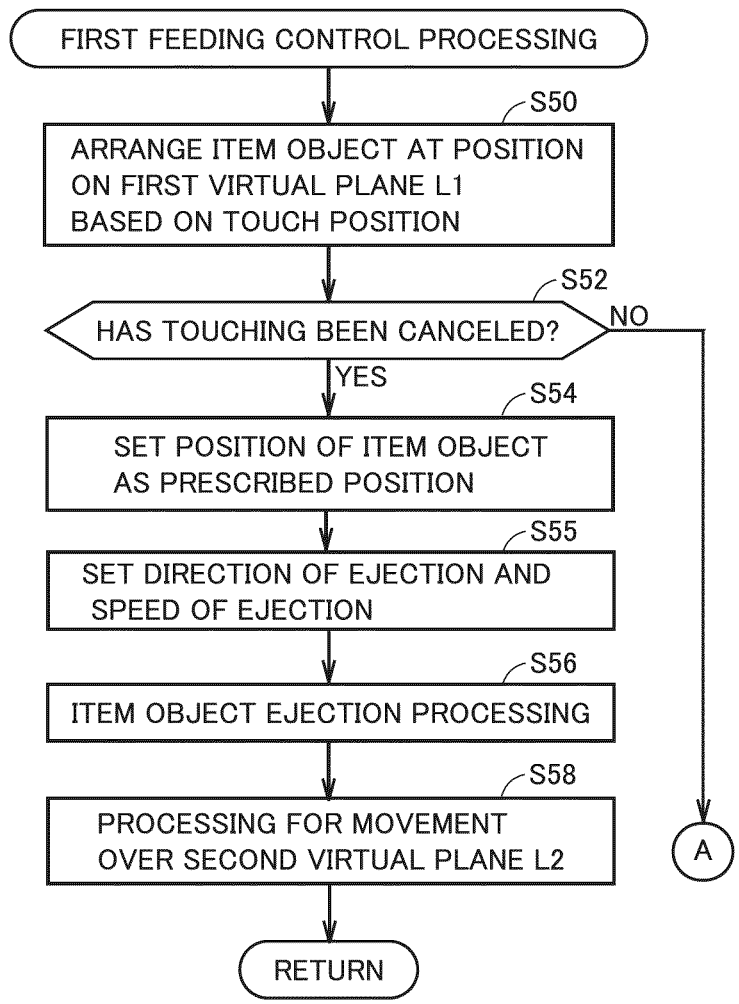
FIG. 17 shows an exemplary illustrative non-limiting flowchart of first feeding control processing by a first feeding unit 202 based on the embodiment.

FIG. 17 is a flowchart illustrating first feeding control processing by first feeding unit 202 based on the embodiment.

Referring to FIG. 17, first feeding unit 202 arranges an item object at a position on first virtual plane L1 based on the touch position (step S50). Then, first feeding unit 202 determines whether or not touching has been canceled (step S52). When first feeding unit 202 determines that touching has been canceled (YES in step S52), it sets the position of item object 304 at that time point as the prescribed position (step S54). As described with reference to FIG. 8, when the user touches item object 304 and moves the touch position beyond virtual boundary line 306 while the user keeps touching, item object 304 moves over first virtual plane L1 with that movement. When touching by the user is canceled, first feeding unit 202 sets the position of item object 304 at that time as prescribed position Q.

Then, first feeding unit 202 sets the direction of ejection and the speed of ejection (step S55). With the touch position where touching has been canceled being defined as point q2 and with the touch position a prescribed time period before the time point of cancellation being defined as point q1 as described with reference to FIG. 8, first feeding unit 202 sets the direction of ejection and the speed of ejection based thereon.

Then, first feeding unit 202 performs processing for ejecting item object 312 from prescribed position Q in accordance with the set direction of ejection and speed of ejection (step S56).

Then, first feeding unit 202 controls item object 312 subjected to ejection processing to reach second virtual plane L2 through inertia and to move over second virtual plane L2 (step S58).

Then, the process ends (return).

When first feeding unit 202 determines that touching has not been canceled (NO in step S52), the process proceeds to "A". In other words, the process returns to step S31 in FIG. 16 and the processing above is repeated until touching is canceled.

There may be a case that the position of point q2 and the position of point q1 are the same (substantially the same) and two-dimensional vector v cannot be calculated. For example, the user may move the touch position out of the initial area, temporarily stop operation, and cancel touching (for example, an operation to stop moving a finger on the outside of the initial area for a while and thereafter simply release the finger).

In this case as well, first feeding unit 202 may set prescribed position Q based on the touch position where touching has been canceled and eject the item object from that position. By way of example, when first feeding unit 202 is unable to calculate two-dimensional vector v, it sets the direction of ejection and the speed of ejection having initial values set in advance and ejects the item object from prescribed position Q. When first feeding unit 202 is unable to calculate two-dimensional vector v, it may quit ejection processing. In this case, the item object may return to the initial position.

Figure 18:
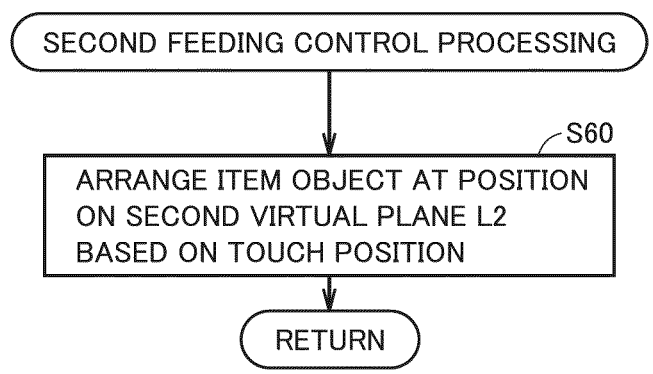
FIG. 18 shows an exemplary illustrative non-limiting flowchart of second feeding control processing by a second feeding unit 204 based on the embodiment.

FIG. 18 is a flowchart illustrating second feeding control processing by second feeding unit 204 based on the embodiment. Referring to FIG. 18, second feeding unit 204 arranges item object 322 at the position on second virtual plane L2 resulting from coordinate conversion based on the touch position (step S60). Then, the process ends (return). Specifically, when the user touches item object 304 and thereafter moves the touch position beyond virtual boundary line 306 as described with reference to FIG. 9, second feeding unit 204 converts a touch coordinate where touch panel 13 was touched and calculates the position on second virtual plane L2. Second feeding unit 204 arranges item object 322 at the calculated position on second virtual plane L2. Second feeding unit 204 thus carries out movement control to move item object 322 to any position on second virtual plane L2 in accordance with the touch position.

Figure 19:
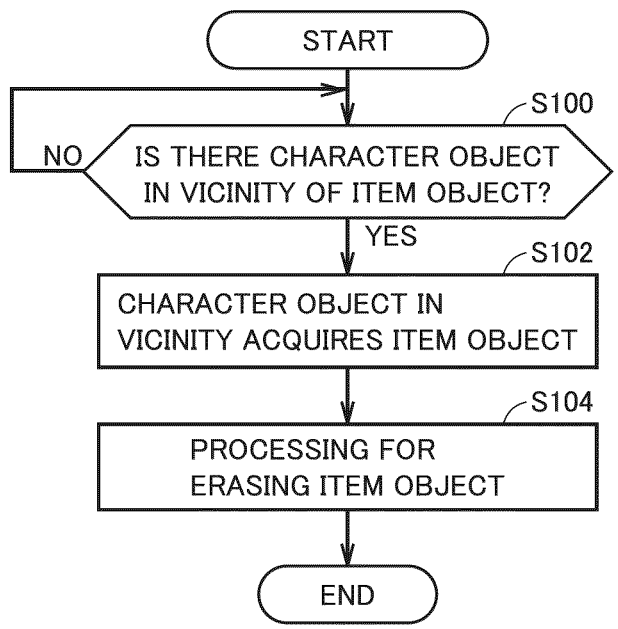
FIG. 19 shows an exemplary illustrative non-limiting flowchart of acquisition processing by an acquisition unit 206 based on the embodiment.

FIG. 19 is a flowchart illustrating acquisition processing by acquisition unit 206 based on the embodiment.

Referring to FIG. 19, acquisition unit 206 determines whether or not character object 302 is present in the vicinity of an item object (step S100). Specifically, as described with reference to FIG. 5, acquisition unit 206 determines whether or not character object 302 is present within range 314 with item object 312 or 322 being defined as the reference.

When acquisition unit 206 determines in step S100 that the character object is not present in the vicinity of the item object (NO in step S100), the state in step S100 is maintained.

When acquisition unit 206 determines in step S100 that character object 302 is present in the vicinity of the item object (YES in step S100), character object 302 in the vicinity acquires the item object (step S102). When acquisition unit 206 determines that character object 302 is present within range 314 with item object 312 or 322 being defined as the reference, it performs processing to allow character object 302 to acquire the item object. Specifically, as the item object is fed to character object 302, an event advantageous for a user during progress of the game may occur.

Then, acquisition unit 206 performs processing for erasing the item object (step S104). Specifically, when item object 312 is acquired in the first feeding scheme, acquisition unit 206 performs processing for erasing acquired item object 312. Thus, another character object 302 is unable to acquire the item object.

Then, the process ends (end).

When item object 322 is acquired in the second feeding scheme in an example in which the user possesses single item object 304, acquisition unit 206 performs processing for erasing item object 322. When the user possesses at least two item objects 304, the acquisition unit decreases the number of possessed item objects by one but it does not have to erase item object 322. In this case, when the number of item objects 304 possessed by the user becomes 0, acquisition unit 206 erases item object 322.

Then, the process ends (end).

Figure 20:
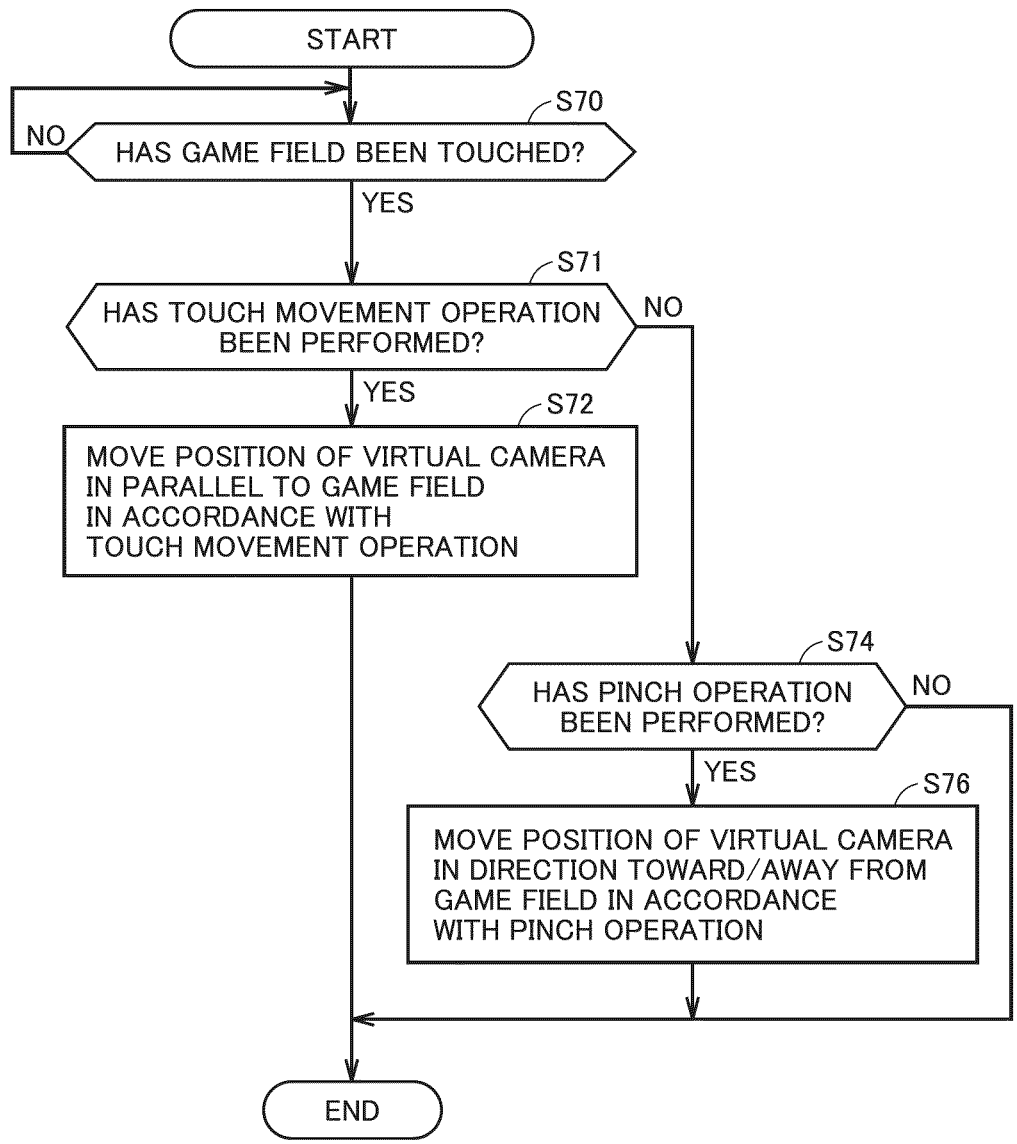
FIG. 20 shows an exemplary illustrative non-limiting flowchart of movement control by a virtual camera movement controller 208 based on the embodiment.

FIG. 20 is a flowchart illustrating movement control by virtual camera movement controller 208 based on the embodiment. Referring to FIG. 20, virtual camera movement controller 208 determines whether or not the game field has been touched (step S70).

When virtual camera movement controller 208 determines in step S70 that the game field has been touched (YES in step S70), it determines whether or not a touch movement operation has been performed (step S71).

When virtual camera movement controller 208 determines in step S71 that the touch movement operation has been performed (YES in step S71), it moves the position of the virtual camera in parallel to the game field in accordance with the touch movement operation (step S72).

Then, the process ends (end).

When virtual camera movement controller 208 determines in step S71 that the touch movement operation has not been performed (NO in step S71), it determines whether or not a pinch operation has been performed (step S74).

When virtual camera movement controller 208 determines in step S74 that the pinch operation has been performed (YES in step S74), it moves the position of the virtual camera in a direction toward/away from the game field in accordance with the pinch operation while it maintains the attitude (step S76).

Then, the process ends (end).

Modification

Figure 21:
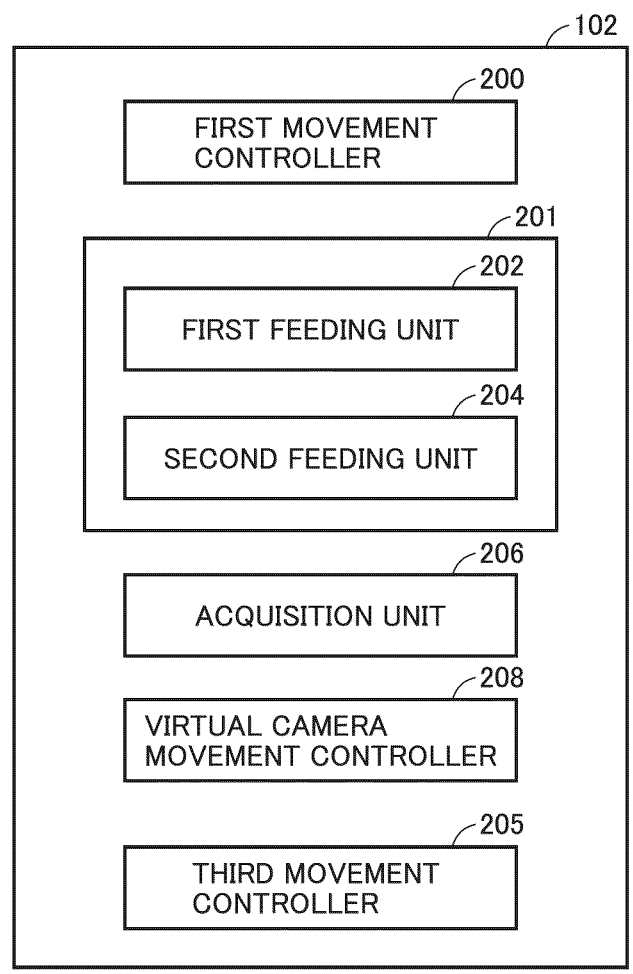
FIG. 21 shows an exemplary illustrative non-limiting drawing of a functional block of information processing apparatus 100 based on a modification of the embodiment.

FIG. 21 is a diagram illustrating a functional block of information processing apparatus 100 based on a modification of the embodiment. Referring to FIG. 21, information processing apparatus 100 based on the modification of the embodiment is different in functional block in FIG. 2 further including a third movement controller 205. Since the configuration is otherwise similar to the configuration in FIG. 2, detailed description will not be repeated.

Third movement controller 205 controls movement of an interfering object (a third object) arranged on the game field. Acquisition unit 206 carries out control such that a character object among a plurality of character objects or the interfering object that satisfies prescribed proximity relation with an item object acquires the item object.

When the interfering object acquires the item object, an event advantageous for the user during progress of the game that occurs by acquisition of the item object by the character object does not occur. Alternatively, no event may occur or an event disadvantageous for the user during progress of the game may occur.

Figure 22:
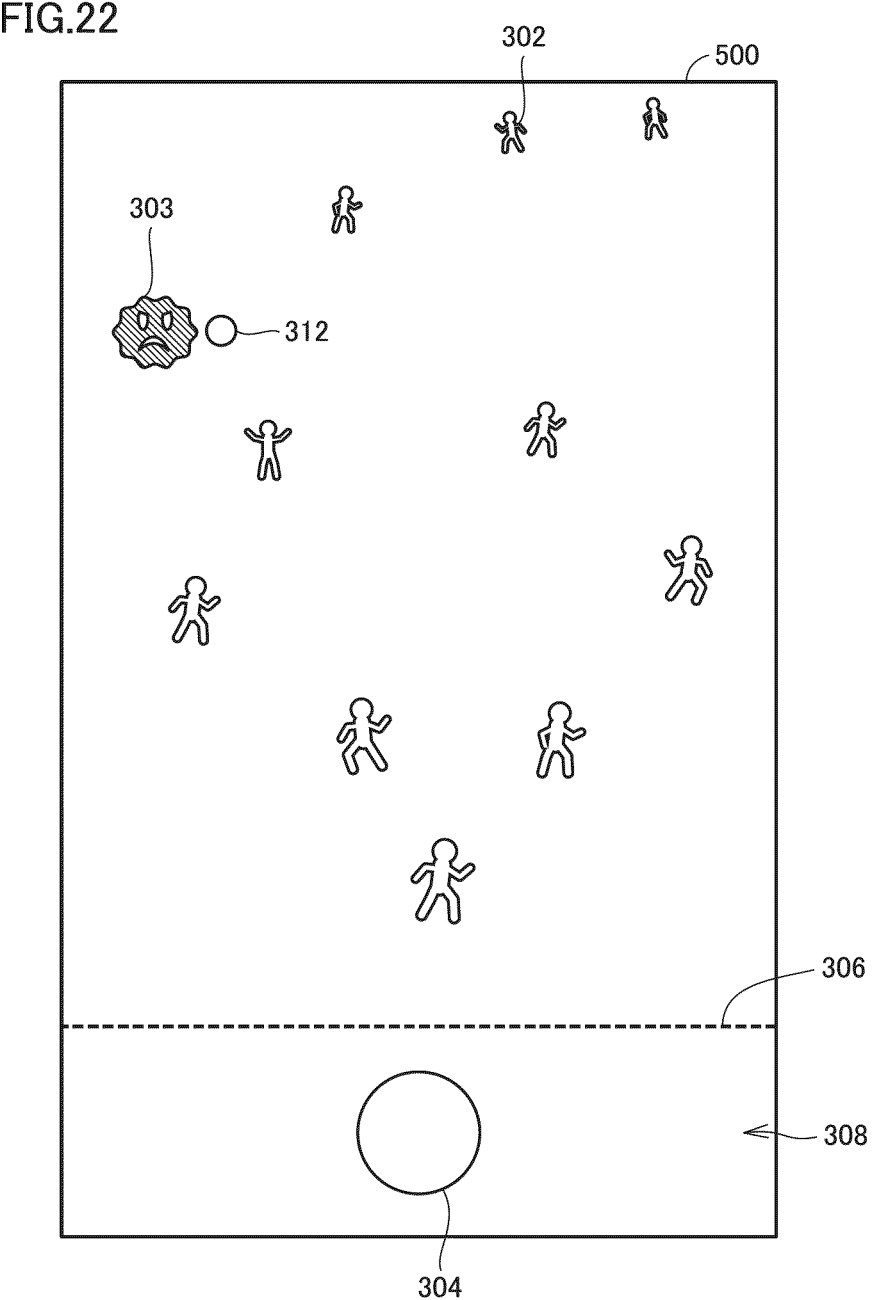
FIG. 22 shows an exemplary illustrative non-limiting drawing of a screen 500 in the game in the game processing provided by game program 122 based on the modification of the embodiment.

FIG. 22 is a diagram illustrating a screen 500 in the game in the game processing provided by game program 122 based on the modification of the embodiment.

As shown in FIG. 22, on screen 500, an interfering object 303 is arranged together with character objects 302 and item object 312. Though the present example describes arrangement of a single interfering object 303, a plurality of interfering objects 303 may be provided.

Interfering object 303 interferes acquisition of item object 312 by character object 302, for example, by acquiring item object 312. By providing interfering object 303, ejection or the like of item object 312 should be controlled not to allow interfering object 303 to acquire item object 312, and zest of the game can be given.

Third movement controller 205 controls movement of interfering object 303.

When interfering object 303 is within a third range with item object 312 being defined as the reference, third movement controller 205 moves interfering object 303 toward item object 312. The third range may be the same as or different from the first range or the second range. Third movement controller 205 may move interfering object 303 toward item object 312 without providing a range. Interfering object 303 may be moved toward item object 322, without being limited to item object 312. Then, interfering object 303 may acquire item object 322.

When interfering object 303 moves toward item object 312 and satisfies prescribed proximity relation (by way of example, at a prescribed distance or shorter from interfering object 303), it acquires item object 312. When interfering object 303 acquires item object 312, item object 312 is erased.

When interfering object 303 is out of the third range after it starts moving toward item object 312 because of a high speed of item object 312 that moves over the field, interfering object 303 may stop moving toward item object 312. Though interfering object 303 is moved in the present example, it may be fixed.

Interfering object 303 may move toward item object 312 at a speed higher than a moving speed of character object 302 (a moving speed in normal movement control processing or a moving speed in movement toward item object 312 or 322).

Interfering object 303 may be eliminated from the game field, for example, by being touched. At this time, interfering object 303 may be transformed into an item object or interfering object 303 may produce an item object. At this time, the number of item objects that appear may be changed, and may be changed, for example, based on the number of item objects acquired by interfering object 303.

H. Additional Aspects

A method of calculating the direction of ejection and the speed of ejection of item object 312 based on a position a prescribed time period before cancellation of the touch position and a touch position where touching has been canceled in the first feeding scheme is described. Without being limited as such, for example, first feeding unit 202 may control movement of item object 312 in the first feeding scheme in consideration of a path or variation in speed until reaching the touch position where touching has been canceled.

Though an example in which item object 312 that has moved out of the area shown on screen 310 as the area on the game field or item object 312 present on the game field for a prescribed period of time is supplied again and the number of item objects 304 returns to the original number is described above, the number does not have to return to the original number.

Though an example in which virtual camera movement controller 208 controls the position of the virtual camera in accordance with the touch movement operation or the pinch operation is described, the position of the virtual camera may be controlled in accordance with another operation. For example, the position of the virtual camera may be controlled by touching the game field a plurality of times. Without being limited to a touch input, the position of the virtual camera may be controlled by an operation onto a direction input key or a button. Alternatively, in response to touching of character object 302 a plurality of times, virtual camera movement controller 208 may bring the virtual camera closer to touched character object 302 and zoom in on that character object.

When virtual camera movement controller 208 moves the position of the virtual camera, first virtual plane L1 is also moved. So long as relative positional relation with item object 304 is not varied, however, item object 304 may be moved. Without being limited to movement processing, the position of the virtual camera may be set by new calculation or the like. When a distance of movement of the virtual camera is long and first virtual plane L1 or item object 304 enters, for example, the game field, first virtual plane L1 or item object 304 may be not allowed to move any more. Furthermore, variation in relative positional relation with item object 304 with movement of the position of the virtual camera may be permitted.

Though a scheme in which first movement controller 200 moves character object 302 in accordance with the flick operation input is described above, without being limited to such an operation input, the character object may be moved in accordance with another operation input.

Processing for facilitating acquisition of the item object by specific character object 302 may be performed. For example, when specific character object 302 is selected by being touched (a sixth user operation input), a moving speed of specific character object 302 toward item object 312 or 322 that is present at the time of selection or will be present in a prescribed period after selection may be increased. Alternatively, the first range, the second range, or prescribed proximity relation set for specific character object 302 may be set to be larger than when the specific character object is not selected. Alternatively, specific character object 302 may be moved toward item object 312 or 322 regardless of the first range or the second range. In order to inform the user of which specific character object 302 has been selected or the fact of selection of character object 302, a prescribed notification function may be performed or specific character object 302 may take a prescribed action. Simultaneously or alternatively, processing for not allowing character object 302 other than specific character object 302 to acquire item object 312 or 322 or processing for making acquisition by character object 302 other than specific character object 302 difficult may be performed.

A single type of character object 302 does not have to be provided but many types of character objects may be provided. At this time, an effect at the time of acquisition of item object 312 or 322 may be different or identical depending on the type of character objects 302.

Though a scheme in which initial area 308 defined by virtual boundary line 306 is provided and second movement controller 201 performs first feeding control processing or second feeding control processing based on whether or not the touch position moves beyond virtual boundary line 306 is described above, initial area 308 does not have to be provided. For example, a scheme in which second movement controller 201 performs first feeding control processing or second feeding control processing based on whether or not the touch position corresponds to the initial position, that is, the touch position has moved from the initial position, may be applicable.

Though a scheme for performing second feeding control processing when a prescribed period or longer has elapsed since the touch position moved beyond virtual boundary line 306 is described above, limitation as such is not intended. For example, second feeding control processing may be performed when a duration of touching exceeds a prescribed period, regardless of virtual boundary line 306. Alternatively, second feeding control processing may be performed when the touch position does not move for a period longer than a prescribed period while touching is continued (including an example in which the touch position substantially does not move) regardless of whether or not the touch position moves beyond virtual boundary line 306. In addition, second feeding control processing may be performed depending on a prescribed condition or input, without being limited to the duration of touching.

Though a scheme in which first movement controller 200 moves character object 302 toward item object 312 or 322 when positional relation between character object 302 and item object 312 or 322 satisfies prescribed relation (being within the first or second range by way of example) is described above, another condition may be added. By way of example, a state of character object 302 may be added as the condition. For example, when the level of character object 302 cannot be increased from the current level, character object 302 may be not allowed to move toward the item object.

Though an example in which first movement controller 200 can move all character objects 302 toward item object 322 while item object 322 is located on the game field is also described above, also similarly in this case, at least one of character objects 302 may be not allowed to move.

Though an example in which the first range and the second range with item object 312 or 322 being defined as the reference are different between the first feeding scheme and the second feeding scheme is described above, the first range and the second range may be set with character object 302 being defined as the reference. Alternatively, the first range and the second range may be set individually for each character object 302. The second individual range set for each character object may be larger than the first range.

Though a scheme in which first movement controller 200 moves character object 302 toward item object 312 or 322 when positional relation between character object 302 and item object 312 or 322 satisfies prescribed relation (being within the first or second range by way of example) is described above, a scheme in which the range is not set is also applicable. For example, first movement controller 200 may determine whether or not to move the character object toward item object 312 or 322 based on various conditions such as preference of character object 302, an attribute of the item object, or a state of the game field and carry out movement control based on the determination. When an identical condition is satisfied, even character object 302 more distant from item object 322 in the second feeding scheme than from item object 312 in the first feeding scheme may be moved.

Though an example in which prescribed proximity relation for acquiring an item object is based on a condition identical in the first feeding scheme and the second feeding scheme is described above, without being limited as such, the condition may be different. For example, a range of acquisition may be different.

Though the virtual three-dimensional space is described above, the virtual two-dimensional space is also similarly applicable.

Though an example in which an item object is moved over the first virtual plane by means of the first feeding unit and an item object is moved over the second virtual plane by means of the second feeding unit is described above, processing for controlling movement of an item object by using different virtual planes is applicable also to an application other than the game in which an item object is fed to a character object in the present example. For example, the processing is applicable also to a game in which an item object is ejected or arranged in the game field regardless of a character object.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. An information processing system:
a memory and at least one processor configured to perform operations comprising:
arranging a plurality of first objects on a field;
setting a first position on the field based on a first user operation, the first position being a position where one of the plurality of first objects that satisfies first positional relation with the position is caused to acquire a second object;
moving the first position on the field based on a second user operation;
canceling the first position based on a third user operation;
decreasing an amount of the second object possessed by a user based on acquisition by one of the plurality of first objects;
canceling the first position when the decreased amount of the second object satisfies a prescribed condition; and
maintaining the first position when the decreased amount of the second object does not satisfy the prescribed condition.

2. The information processing system according to claim 1, wherein
the prescribed condition is that the amount of the second object is zero.

3. The information processing system according to claim 1, wherein
a third object indicating the second object is displayed at the first position.

4. The information processing system according to claim 1, wherein
the plurality of first objects are moved toward the first position.

5. The information processing system according to claim 4, wherein
one of the plurality of first objects that cannot acquire the second object is not moved toward the first position.

6. The information processing system according to claim 1, wherein
the first user operation is a touch operation,
the second user operation is an operation to move a touch position while the touch operation is maintained, and
the third user operation is a cancellation operation to cancel the touch operation.

7. The information processing system according to claim 1, wherein
based on a fourth user operation, a third object indicating the second object is arranged on the field and the amount of the second object possessed by the user is decreased.

8. The information processing system according to claim 7, wherein
one of the plurality of first objects that satisfies second positional relation with the arranged third object is caused to acquire the second object.

9. The information processing system according to claim 8, wherein
the plurality of first objects are moved toward the arranged third object.

10. A method of controlling an information processing system comprising:
arranging a plurality of first objects on a field;
setting a first position on the field based on a first user operation, the first position being a position where one of the plurality of first objects that satisfies first positional relation with the position is caused to acquire a second object;
moving the first position on the field based on a second user operation;
canceling the first position based on a third user operation;
decreasing an amount of the second object possessed by a user based on acquisition by one of the plurality of first objects;
canceling the first position when the decreased amount of the second object satisfies a prescribed condition; and
maintaining the first position when the decreased amount of the second object does not satisfy the prescribed condition.

11. The method of controlling an information processing system according to claim 10, wherein
the prescribed condition is that the amount of the second object is zero.

12. The method of controlling an information processing system according to claim 10, further comprising displaying a third object indicating the second object at the first position.

13. The method of controlling an information processing system according to claim 10, further comprising moving the plurality of first objects toward the first position.

14. The method of controlling an information processing system according to claim 13, further comprising not moving one of the plurality of first objects that cannot acquire the second object toward the first position.

15. The method of controlling an information processing system according to claim 10, wherein
the first user operation is a touch operation,
the second user operation is an operation to move a touch position while the touch operation is maintained, and
the third user operation is a cancellation operation to cancel the touch operation.

16. The method of controlling an information processing system according to claim 10, further comprising:
arranging a third object indicating the second object on the field based on a fourth user operation; and decreasing the amount of the second object possessed by the user.

17. The method of controlling an information processing system according to claim 16, further comprising causing one of the plurality of first objects that satisfies second positional relation with the arranged third object to acquire the second object.

18. The method of controlling an information processing system according to claim 17, further comprising moving the plurality of first objects toward the arranged third object.

19. A non-transitory computer readable storage medium having an information processing program stored thereon, the information processing program being executable by at least one computer to perform operations comprising:
  arranging a plurality of first objects on a field;
  setting a first position on the field based on a first user operation, the first position being a position where one of the plurality of first objects that satisfies first positional relation with the position is caused to acquire a second object;
  moving the first position on the field based on a second user operation;
  canceling the first position based on a third user operation;
  decreasing an amount of the second object possessed by a user based on acquisition by one of the plurality of first objects;
  canceling the first position when the decreased amount of the second object satisfies a prescribed condition; and
  maintaining the first position when the decreased amount of the second object does not satisfy the prescribed condition.

20. An information processing apparatus:
  a memory and at least one processor configured to perform operations comprising:
  arranging a plurality of first objects on a field;
  setting a first position on the field based on a first user operation, the first position being a position where one of the plurality of first objects that satisfies first positional relation with the position is caused to acquire a second object;
  moving the first position on the field based on a second user operation;
  canceling the first position based on a third user operation;
  decreasing an amount of the second object possessed by a user based on acquisition by one of the plurality of first objects;
  canceling the first position when the decreased amount of the second object satisfies a prescribed condition; and
  maintaining the first position when the decreased amount of the second object does not satisfy the prescribed condition.

* * * * *